United States Patent [19]

D'Atre et al.

[11] Patent Number: 4,475,150

[45] Date of Patent: Oct. 2, 1984

[54] COORDINATED LOAD COMMUTATED INVERTER PROTECTION SYSTEM

[75] Inventors: John D. D'Atre, Ballston Lake, N.Y.; Paul M. Espelage, Salem, Va.; David L. Lippitt, Scotia, N.Y.; Loren H. Walker, Salem, Va.

[73] Assignee: General Electric Company, Salem, Va.

[21] Appl. No.: 372,750

[22] Filed: Apr. 28, 1982

[51] Int. Cl.³ .............................................. H02H 7/00
[52] U.S. Cl. .................................... 363/51; 318/806; 363/79; 364/483
[58] Field of Search ................. 318/798, 806; 363/34, 363/35, 37, 50, 51, 79; 364/480, 483

[56] References Cited

U.S. PATENT DOCUMENTS

| | | | |
|---|---|---|---|
| 3,413,538 | 11/1968 | Hodges . | |
| 3,601,674 | 8/1971 | Joslyn | 318/318 |
| 3,654,541 | 4/1972 | Kelley, Jr. et al. . | |
| 3,750,004 | 7/1973 | Walker . | |
| 3,806,906 | 4/1974 | Young | 340/253 |
| 4,016,468 | 4/1977 | Graf | 318/434 |
| 4,107,771 | 8/1978 | Anderson et al. | 363/58 |
| 4,150,325 | 4/1979 | Miller et al. | 318/434 |
| 4,183,081 | 1/1980 | Walker et al. | 363/81 |
| 4,197,575 | 4/1980 | Young | 363/58 |
| 4,210,956 | 7/1980 | Watanabe | 363/37 X |
| 4,218,729 | 8/1980 | Chambers | 363/54 |
| 4,230,079 | 10/1980 | Espelage et al. | 318/721 |
| 4,237,531 | 12/1980 | Cutler et al. | 363/58 |
| 4,263,557 | 4/1981 | Jarvinen | 318/341 |
| 4,270,078 | 5/1981 | Walker et al. | 318/803 |
| 4,272,816 | 6/1981 | Matsumoto | 364/483 |
| 4,276,505 | 6/1981 | Bose | 318/723 |
| 4,371,908 | 2/1983 | Andow et al. | 364/480 X |
| 4,399,395 | 8/1983 | Espelage | 363/37 X |
| 4,420,719 | 12/1983 | D'Atre et al. | 318/803 |
| 4,427,934 | 1/1984 | Tupper | 318/806 X |

Primary Examiner—William M. Shoop
Attorney, Agent, or Firm—Arnold E. Renner

[57] ABSTRACT

A fault protective system for a load commutated inverter motor drive including an AC to DC source side converter coupled from an AC source to a DC to AC load side converter via a DC link circuit and wherein the load side converter supplies AC power of varying magnitude and frequency to the synchronous motor load. A pair of microcomputers interlinked by a common digital memory respectively control the inverters and interface with hardware type sensor means for detecting the occurrence of a plurality of different types of faults. Additionally, a number of stored instructional sets or programs are respectively included in both microcomputers to detect by software means another plurality of faults. The detection of a fault on either side of the link circuit is communicated to the respective computer which subsequently communicates with the other microcomputer to effect a coordinated protective action in response to thyristor cell failures, circuit failures, and abnormal operating conditions. Cell failure faluts include those instances where a thyristor cell actually fails due to an open or short circuit as well as those cases where a cell fails to commutate properly due to firing strategy problems. Cirucit failures include open and short circuits both in the supply line and the motor leads, while abnormal operating conditions involve such things as low line voltage or excessive motor voltage.

38 Claims, 19 Drawing Figures

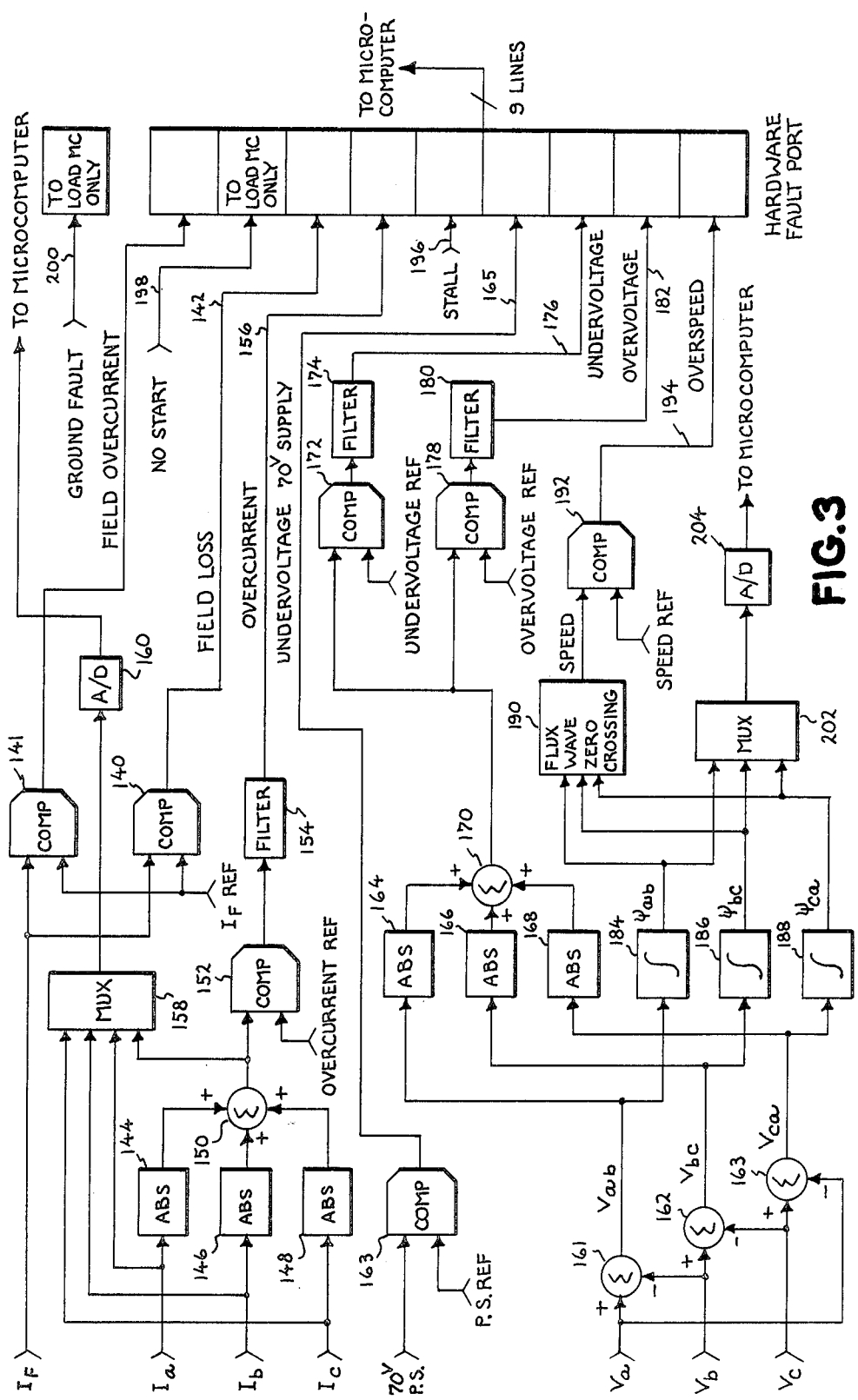

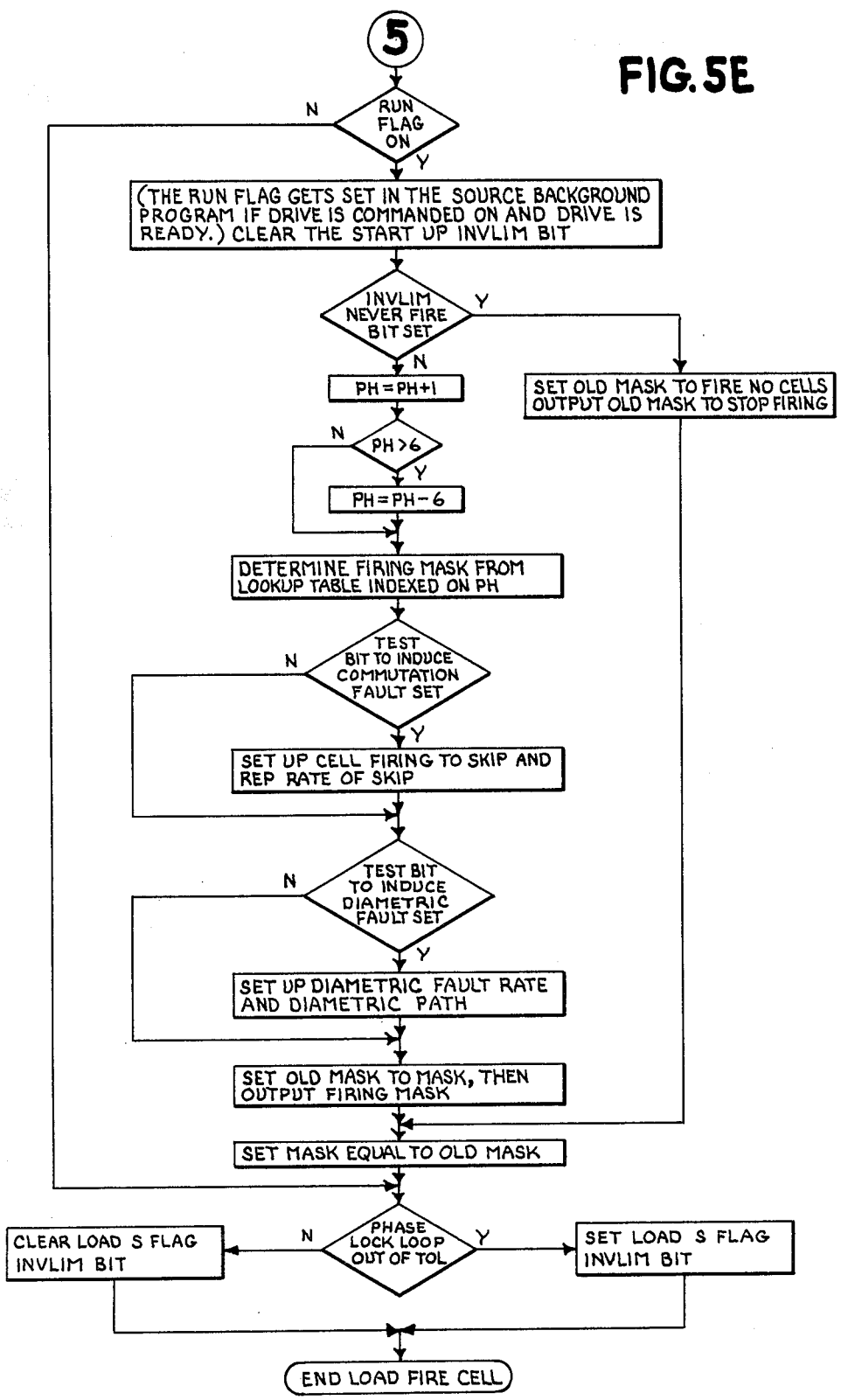

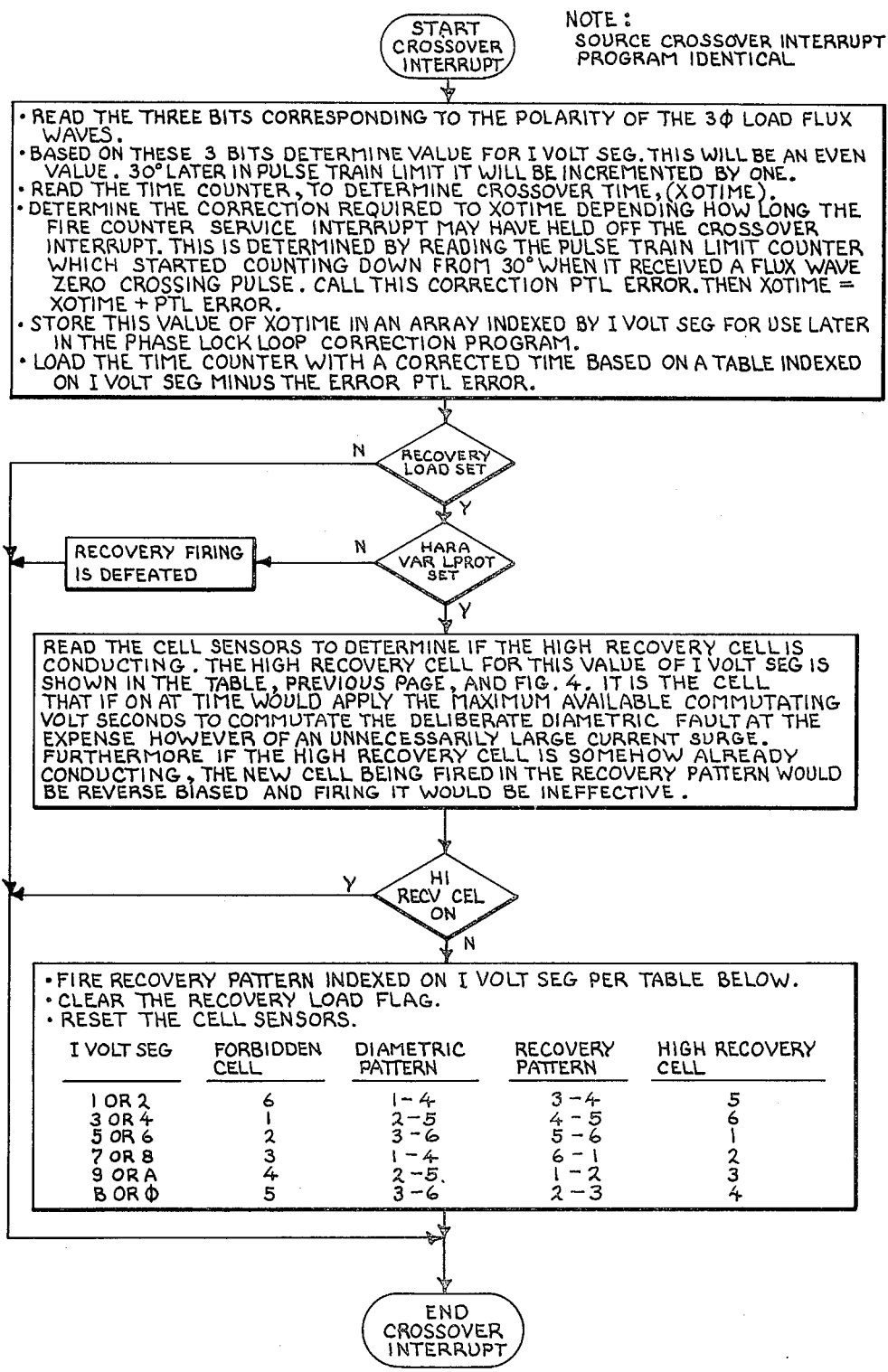

COORDINATED LOAD COMMUTATED INVERTER PROTECTION SYSTEM

REFERENCED MATERIAL

Reference is made to a microfiche appendix which sets forth a computer program listing including that which is applicable to the present invention. Included are 8 microfiche containing a total of 458 frames.

CROSS REFERENCE TO RELATED APPLICATIONS

This application is related to the following applications which are assigned to the assignee of the present invention and which are herein meant to be incorporated by reference:

U.S. Ser. No. 300,200, entitled, "Line-to-Line Voltage Reconstruction For Synchronizing Thyristor Power Converter", filed on Sept. 8, 1981 in the name of Paul M. Espelage; and now U.S. Pat. No. 4,399,395, issued Aug. 16, 1983;

U.S. Ser. No. 333,933, entitled, "Flux Feedback Firing Control For A Load Commutated Inverter", filed on Dec. 23, 1981 in the names of David L. Lippitt, et al.; and now U.S. Pat. No. 4,449,087, issued May 15, 1984;

U.S. Ser. No. 333,929, entitled, "Cross-Tied Current Regulator For Load Commutated Inverter Drives", filed on Dec. 23, 1981 in the names of John D. D'Atre, et al.; and now U.S. Pat. No. 4,420,719, issued Dec. 13, 1983;

U.S. Ser. No. 322,741, entitled, "Terminal Voltage Limit Regulator For A Load Commutated Inverter", filed on Nov. 19, 1981 in the name of Leland C. Tupper; and now U.S. Pat. No. 4,446,414, issued May 1, 1984;

U.S. Ser. No. 343,916, entitled, "Current Limiter For A Load Commutated Inverter", filed on Jan. 29, 1982 in the name of Leland C. Tupper; and now U.S. Pat. No. 4,427,934, issued Jan. 24, 1984, U.S. Ser. No. 364,453, entitled, "Transitioning Between Multiple Modes of Inverter Control In A Load Commutated Inverter Motor Drive", filed on Apr. 1, 1982 in the name of B. Paul Chausse, et al; and now U.S. Pat. No. 4,443,747, issued Apr. 17, 1984; and U.S. Ser. No. 372,749, entitled, "Twelve Pulse Load Commutated Inverter Drive System", filed on Apr. 28, 1982 in the name of Paul M. Espelage, et al; and now U.S. Pat. No. 4,426,611, issued Jan. 17, 1984.

BACKGROUND OF THE INVENTION

This invention relates generally to means for protecting thyristor power conversion systems and more particularly to a coordinated protection system for a load commutated inverter motor drive including a source side converter and a load side converter coupled together via a DC link circuit.

Many circuits and systems are known for controlling the conductivity of controlled rectifiers utilized in various types of power converters for supplying electrical power to a load such as an AC motor from a polyphase alternating current (AC) source. The type of rectifier used controls, to some degree, the type of control utilized but by far the most common controlled rectifier used in practice today is a thyristor of the silicon controlled rectifier (SCR) type which becomes conductive with the simultaneous application of a forward bias voltage and a signal applied to its gate electrode and which thereafter remains conductive until the anode current falls below the value required to hold the thyristor in its conductive state. Furthermore, motor control systems are known which utilize thyristor circuits in various configurations via a DC link circuit.

Whereas analog control techniques, a typical example being U.S. Pat. No. 4,230,979 entitled, "Control Current Inverter And Motor Control System", issued to Paul M. Espelage, et al. on Oct. 28, 1980, were first employed in such motor control systems, attention now is being directed to digital types of control systems. Examples of digital type systems are disclosed in: U.S. Pat. No. 3,601,674, entitled, "Control System For Firing SCR's In Power Conversion Apparatus", which issued to John A. Joslyn, et al. on Aug. 24, 1971; U.S. Pat. No. 4,263,557, entitled, "Power Converter Control", which issued to Willard B. Jarvinen on Apr. 21, 1981; and U.S. Pat. No. 4,276,505, entitled, "Microcomputer Based Control Apparatus For A Load Commutated Inverter Synchronous Machine Drive System", which issued to Bimal K. Bose on June 30, 1981. The teachings of these patents are also intended to be incorporated by reference. Additionally in the aforementioned related applications, there are disclosed further improvements in digitally controlled load commutated inverter motor drive systems. Such systems, moreover, include control means which are implemented by the software included in microprocessor apparatus.

It is also well known that thyristor power conversion systems include means which are adapted to protect the system against one or more fault conditions by sensing the occurrence of a particular type of fault and thereafter causing some corrective action to be taken to prevent consequential damage, primarily to the thyristors. In some instances the system is adapted to recover from momentary faults, but in the event of hard faults or conditions indicative of a hard fault, the system is shut down in an orderly fashion. Typically, the type of faults detected include undervoltage and overvoltage, overcurrent, reverse current, shoot through, commutation failure and ground faults. In the case of motor controls, motor overspeed is also protected against.

Circuitry for monitoring and sensing the state of the thyristor cells of a power converter are shown, for example, in U.S. Pat. No. 3,654,541, entitled, "Thyristor State Sensor", issued to F. W. Kelly, et al. on Apr. 4, 1972 and U.S. Pat. No. 3,806,906, entitled, "Cell Surveillance Monitor For A Power Converter", issued to J. A. Young on Apr. 23, 1974.

Typical examples of protective circuitry for overcurrent and overvoltage conditions are disclosed in: U.S. Pat. No. 3,413,538, entitled, "Control Means For Starting Electric Power Converters At Reduced Operating Frequencies", issued to M. Hodges on Nov. 26, 1968; U.S. Pat. No. 3,750,004, entitled, "Instantaneous Current Control For Static Inverters", issued to L. Walker on July 31, 1973; U.S. Pat. No. 4,237,531, entitled, "Controlled Current Inverter System Having Semiconductor Overvoltage Protection", issued to J. H. Cutler, et al. on Dec. 2, 1980, and U.S. Pat. No. 4,272,816, entitled, "Overcurrent Protecting Apparatus", issued to Y. Matsumoto on June 9, 1981.

Examples of methods and apparatus for detecting and correcting for shoot through and commutation faults are disclosed in: U.S. Pat. No. 4,016,468, entitled, "Controlled Rectifier Motor Drive System Including DC Fault Detection And Commutation Means", issued to C. Graf on Apr. 5, 1977; U.S. Pat. No. 4,107,771, entitled, "Circuit For Shuting Down An Inverter", issued to T. Anderson, et al. on Aug. 15, 1978; U.S. Pat. No. 4,150,325, entitled, "Power Conversion System Having Conversion Fault Detection And Correction Circuit", issued to R. Miller, et al. on Apr. 17, 1979; U.S. Pat. No. 4,183,081, entitled, "Inverter System Including Commutation Failure Prevention Scheme", issued to J. Cutler, et al. on Jan. 8, 1980; U.S. Pat. No. 4,197,575, entitled, "Conduction Through Sensing And Inverter Protection System", issued to J. Young, on Apr. 8, 1980; U.S. Pat. No. 4,218,729, entitled, "Polyphase Rectifying Bridge With Commutation Fault Protection", issued to G. Chambers on Aug. 19, 1980, and U.S. Pat. No. 4,270,078, entitled, "Method And Apparatus For A Variable Frequency Inverter System Having Commutation Fault Detection And Correction Capabilities" issued to L. Walker, et al. on May 26, 1981.

SUMMARY OF THE INVENTION

It is therefore an object of the present invention to provide an improvement in systems for protecting an AC power conversion system.

It is a further object of the invention to provide an improved system for detecting a plurality of individual faults and causing specified corrective actions to be taken in a load commutated inverter synchronous motor drive system.

It is still a further object of the invention to provide a coordinated computer controlled protection system involving both the source side converter and the load side converter of a load commutated inverter drive system.

Still a further object of the invention is to provide a response for both hardware and software detected faults in a computer controlled protective system for a load commutated inverter motor drive system.

The foregoing and other objects are achieved by a fault protective system for an AC to DC source side converter coupled from an AC source to a DC to AC load side converter via a DC link circuit and wherein the load side converter supplies AC power of varying magnitude and frequency to an AC load, typically a synchronous motor. A pair of microcomputers interlinked by a common digital memory respectively control the inverters and interface with hardware means for detecting the occurrence of a plurality of different types of faults. Additionally, a number of stored instructional sets or programs commonly referred to as software, are included in the microcomputers to detect another plurality of faults prior to every cell firing or the thyristor cells in both converters. The detection of a fault on either side of the link circuit is communicated to the respective microcomputer which subsequently communicates with the other microcomputer to effect a coordinated protective action in response to thyristor cell failures, circuit failures and abnormal operating conditions. With respect to hardware detected faults, certain types of faults cause direct corrective action to be taken irrespective of microcomputer operation; however, for other types of faults, communication to the respective microcomputer commands appropriate corrections such as commanding both the source and load side converters to their inversion limit followed by either an attempted recovery or system shut-down. With respect to software detected faults, each type of fault is adapted to set a particular bit in a multi-bit word in the memory which acts to command both converters to fire at the inversion limit and thus being the DC link current to zero, after which there is initiated either a predetermined recovery procedure for reinstating normal operation or a tripping of the certain circuit interrupters to shut the system down, again in an orderly manner.

BRIEF DESCRIPTION OF THE DRAWINGS

While the present invention is defined in the claims annexed to and forming a part of this specification, a better understanding can be had by reference to the following description taken in conjunction with the accompanying drawings in which:

FIG. 3 is an electrical block diagram illustrative of other various types of voltage and current sensing circuitry included in the sensor assembly shown in FIG. 1;

FIGS. 5A through 5E comprise a flow chart illustrative of the LOAD FIRE CELL software routine included in the load side converter for implementing predetermined protective procedures therein;

FIG. 7 comprises a flow chart illustrative of the CROSSOVER software routine included in the load side converter for partially implementing predetermined protective procedures therein;

DESCRIPTION OF THE PREFERRED EMBODIMENT

Figure 1:
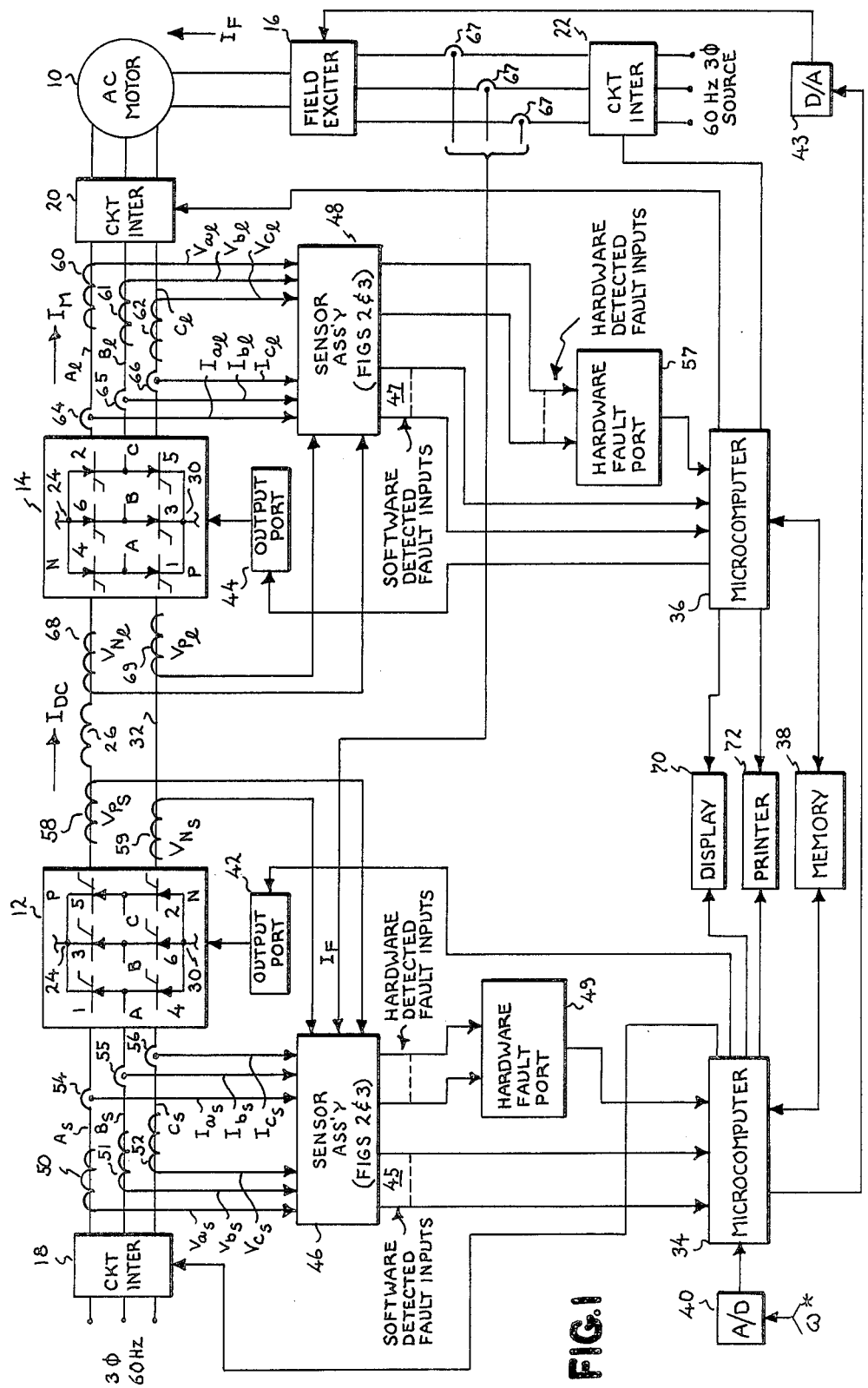
FIG. 1 is an electrical block diagram generally illustrative of the preferred embodiment of the subject invention.

Referring now to the drawings and more particularly to FIG. 1, shown therein in an electrical block diagram for controlling an alternate current (AC) motor load 10. The load comprises a synchronous motor powered from a three phase (3ϕ) AC power source, now shown, coupled to line terminals $L_1$, $L_2$ and $L_3$ in accordance with the operation of a source side AC to direct current (DC) power converter 12 and a load side DC to AC power converter 14. A field exciter 16 provides field excitation for the motor 10. The system is adapted to include one or more circuit breakers or interrupters including, for example, the switchgear 18, 20 and 22 which are adapted to disconnect the system in an orderly manner, for example, upon the occurrence of one or more "hard" faults where it becomes necessary to selectively disconnect the source, motor or field exciter from the power line to which it is connected.

Both converter 12 and 14 include a well known thyristor bridge circuit which includes at least six thyristor cells which are fired in the numerical order and as shown in FIG. 1 and are coupled in diametric leg pairs of: 1 and 4, 3 and 6, and 5 and 2. The common connection between cells 1 and 4 is coupled to phase line A whereas the common connection between cells 3 and 6 and 5 and 2 are coupled to phase lines B and C, respectively. The common connection 24 between the cells 1, 3 and 5 comprises the positive side of the bridge and connects to the inductor 26 of the DC link circuit 28 while the common connection 30 between cells 4, 6 and 2 comprises the negative side of the bridge and connects to the line 32 of the DC link circuit 28.

The source side converter 12 operates to convert the 3$\phi$ AC power into a source of variable DC current which is coupled by way of a DC link circuit 28 to the load side converter 14. The load side converter 14 in turn operates to generate an AC current of variable frequency which is supplied to the motor 10. The thyristor bridge circuits included in the source side converter 12 and the load side converter 14 have their conductivity controlled by means of respective phase lock loop firing control circuits, not shown, implemented by means of the software, i.e. stored instructional sets or programs in microcomputer apparatus adapted to operate in response to certain signal inputs, as well as appropriate current regulators and load angle regulators which operate in accordance with a torque command signal T* applied thereto which is developed from a speed reference signal $\omega$* coupled to an analog to digital converter 40 shown in FIG. 1 coupled to the microcomputer 34. The firing signals are applied from respective microcomputers 34 and 36 to the thyristor bridges 12 and 14 by means of output ports 42 and 44. The field exciter 16 furthermore is controlled by the microprocessor 36 by way of the D/A converter 43. This type of operation is disclosed in further detail for example in U.S. Ser. No. 364,453, and now U.S. Pat. No. 4,443,747, entitled, "Transitioning Between Multiple Modes Of Inverter Control In A Load Commutated Inverter Motor Drive".

Figure 2:
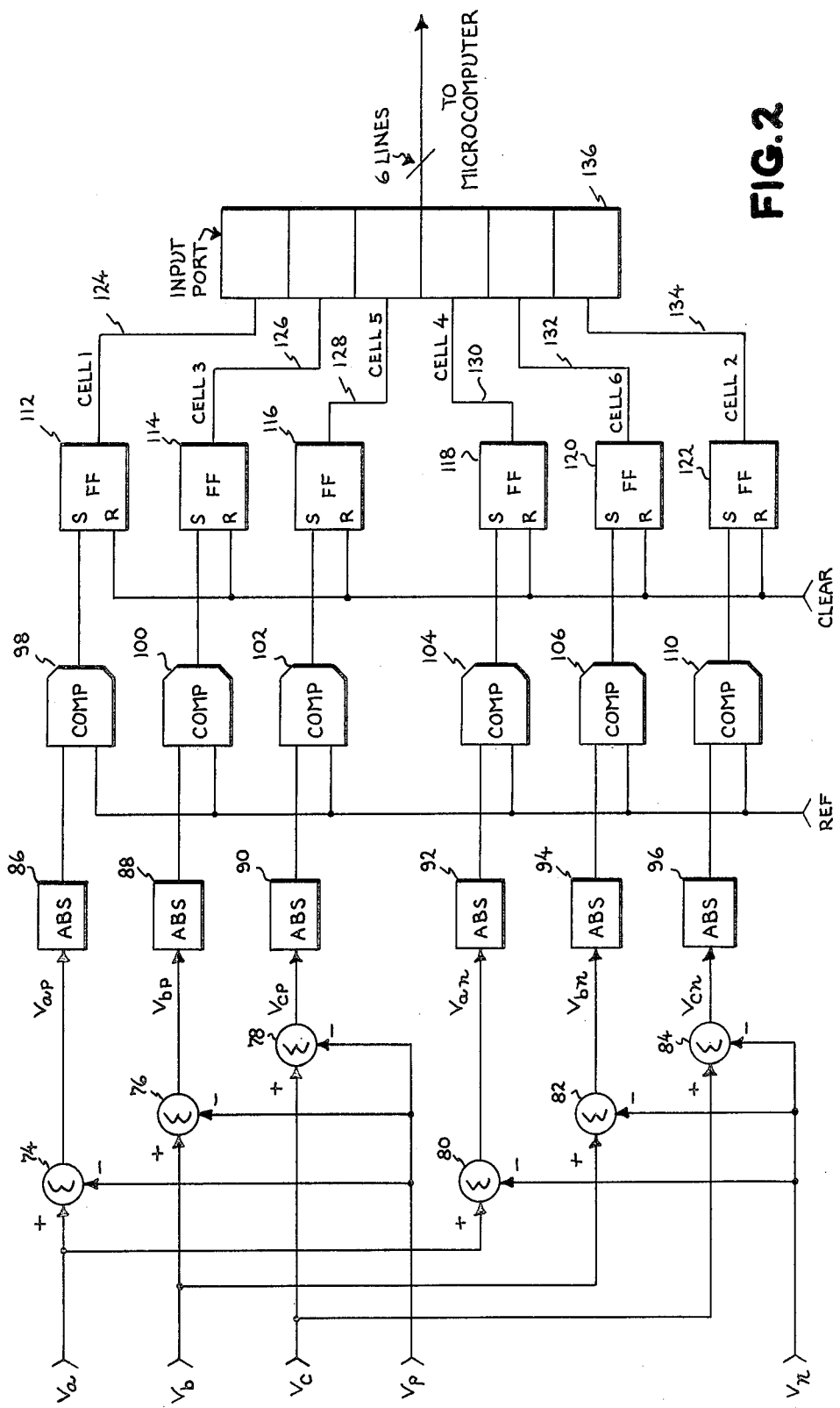
FIG. 2 is an electrical block diagram of the cell sensor circuitry included in the sensor assembly shown in FIG. 1.

In order to provide protective responses, the source side microcomputer 34 and the load side microcomputer 36 are adapted to respond to signals resulting from both hardware detected faults and software detected faults as well as signals from each other. A pair of sensor assemblies 46 and 48, which include circuits such as shown in FIGS. 2 and 3, are respectively adapted to operate in response to the source side and load side line currents and voltages as well as the DC voltages of both positive and negative polarities, on the DC link circuit 28. More particularly, and as shown in FIG. 1, the sensor assembly 46 has applied thereto the three source side phase to neutral voltages $V_{as}$, $V_{bs}$, and $V_{cs}$ which are applied from voltage sensors 50, 51 and 52 coupled to the phase lines $A_s$, $B_s$ and $C_s$ while the three source side phase currents $I_{as}$, $I_{bs}$ and $I_{cs}$ are generated by current sensors 54, 55 and 56. In addition to the three source side phase voltages and currents, the positive and negative voltages $V_{ps}$ and $V_{ns}$ on the source side of the inductor 26 are coupled to the sensor assembly 46 by way of the voltage sensors 58 and 59. In a like manner, the load side phase to neutral voltages $V_{al}$, $V_{bl}$ and $V_{cl}$ are coupled to the sensor assembly 48 by means of the voltage sensors 60, 61 and 62 coupled to the load side phase lines $A_l$, $B_l$ and $C_l$ while the phase currents $I_{al}$, $I_{bl}$ and $I_{cl}$ are applied via the current sensors 64, 65 and 66. The positive and negative voltages $V_{pl}$ and $V_{nl}$ appearing across the thyristor bridge of converter 14 is applied by means of the voltage sensors 69 and 68.

Prior to discussing the invention further, the type of protective features provided by the invention will now be considered. To this end the protection strategy of the invention considers a plurality of faults, but mainly faults due to: (1) cell failures, (2) circuit failures and (3) abnormal operating conditions. This first main fault type includes those conditions where a cell actually fails due to an open or short circuit as well as those cases where a cell fails to commutate properly or a "shoot through" occurs due to firing strategy problems. Circuit failure faults include open and short circuits both in the supply line and the motor lines. Abnormal operating condition faults involve such occurrences as low line voltage or excessive motor voltage.

With respect to active cell failures, the existence of a fault of this type is established by noting the pattern of thyristor cell conduction. Commutation faults, however, are noted by observing the existence of conduction in a thyristor cell at a time just beyond the last point at which the cell should have been commutated off by its natural successor. In other words, if cell 5 is still conducting at the time it is too late for cell 1 to commutate cell 5 off, it is assumed that there is a commutation failure. Similarly, if both diametric cells in a given phase of a thyristor bridge circuit are conducting simultaneously, it is assumed that a short through fault has occurred.

With respect to cell failure faults, the method of detecting the cell conduction pattern is by means of the appropriate microcomputer software in conjunction with thyristor cell state sensors and AC current transformers. Other circuit failures and abnormal operating condition faults are detected by the hardware implemented in the sensor assemblies 46 and 48 shown in FIG. 1.

Prior to describing the hardware and software faults in any detail, reference now will be made to FIGS. 2 and 3 which are intended to illustrate the various circuit elements which are typically included in the sensor assemblies 46 and 48. Inasmuch as both sensor assemblies are substantially identical, the following description is intended to pertain to either assembly. Considering first FIG. 2, shown therein is a means for sensing the operation of the six thyristor cells 1, 2, 3 . . . 6 in each of the converters 12 or 14 by effectively sensing the thyristor leg voltages $V_{ap}$, $V_{bp}$, $V_{cp}$, $V_{an}$, $V_{bn}$ and $V_{cn}$ which are developed by comparing the line to neutral voltages $V_a$, $V_b$ and $V_c$ and $V_p$, the positive DC link voltage, in the summing junctions 74, 76 and 78 as well as comparing the same three line to neutral voltages against the negative polarity link voltage $V_n$ in the summing junctions 80, 82 and 84. The six leg voltages $V_{ap}$, $V_{bp}$, etc. are fed to respective absolute value circuits 86, 88, 90, 92, 94 and 96 which provide output signals that are applied to individual comparator circuits 98, 100, 102, 104, 106 and 110. As shown in FIG. 2, all the comparator circuits 98, 100 . . . 110 have their other input commonly connected to a reference signal (REF). Depending upon the condition of each of the thyristor cells, the comparator circuits 98, 100 . . . 110 will output signals corresponding to either an ON or OFF state of the respective thyristor cell which is adapted to set or fall to set one of six flip-flops 112, 114, 116, 118, 120 and 122. These flip-flops accordingly generate high "one" or low "zero" digital signals corresponding to the thyristor ON/OFF state of each thyristor of the bridge. As shown, the six flip-flops 112, 114 . . . 122 have their reset inputs connected to a clear (CLEAR) signal which is applied at a predetermined time, e.g. 400 μs following any thyristor firing on that converter. The output lines 124, 126, 128, 130, 132 and 134 are coupled to an input port 136 which is adapted to provide a six bit digital input to the appropriate microcomputer 34 or 36.

Referring now to FIG. 3, each sensor assembly additionally includes inputs of the three 3φ line currents $I_a$, $I_b$ and $I_c$ along with the phase line to neutral voltages $V_a$, $V_b$ and $V_c$ previously referred to with respect to FIG. 2. Also an input corresponding to the field current $I_f$ is adapted to be coupled thereto from a current sensor 67 as shown in FIG. 1. The current $I_f$ as shown in FIG. 3 is fed to one input of a comparator circuit 140 whose other input comprises a field current reference signal ($I_f$ REF). The comparators 140 and 141 are adapted to provide signals corresponding to either the loss of field current or an indication of overcurrent, which signals are coupled to a Hardware Fault Port, coupled to appropriate microcomputer 34 or 36. The phase currents $I_a$, $I_b$ and $I_c$ are fed to absolute value circuits 144, 146 and 148 whose outputs are summed in a summing junction 150 and compared against an overcurrent reference signal (OC REF) which is furnished through a time delay circuit 154 to provide an overcurrent signal on lead 156. This signal comprises a digital signal which is coupled to the microcomputer through the Hardware Fault Port. Additionally, the phase currents $I_a$, $I_b$, $I_c$ are coupled to a multiplexer 158 along with the current output signal $I_{DC}$ of the summing junction 150 which corresponds to the current in the DC link circuit 28 (FIG. 1). The multiplexer 158 is coupled to an analog to digital (A/D) converter 160, where the four current signals are sequentially fed in digital format to the appropriate microcomputer for internal use in controlling the appropriate converter as well as implementing software detected current faults.

The line-to-neutral voltages $V_a$, $V_b$ and $V_c$ are additionally compared in three summing junctions 161, 162 and 163 in a well known manner to provide the three phase line to line voltages $V_{ab}$, $V_{bc}$ and $V_{ca}$. The absolute values of these line to line voltages are provided by the circuits 164, 166 and 168 and are summed together in a summing junction 170 from which undervoltage and overvoltage fault signals are next derived. The undervoltage signal is provided by a comparator circuit 172 having one input coupled to the summing junction 170 aong with the application of an undervoltage reference signal (UV REF). The output of the comparator 172 is delayed via circuit 174 and an undervoltage fault signal is adapted to be applied to the Hardware Fault Port via the line 176. In a similar manner, the overvoltage detection signal is generated by a comparator circuit 178 having one input coupled to the summing junction 170 while its other input is coupled to an overvoltage reference signal (OV REF). The output of the comparator 178 is delayed in a delay circuit 180 and applied to the Hardware Fault Port via circuit lead 182. Accordingly, the comparators 172 and 178 are respectively adapted to output undervoltage and overvoltage fault signals on leads 176 and 182 depending upon the values of the line to line voltages $V_{ab}$, $V_{bc}$ and $V_{ca}$.

The three line to line voltages $V_{ab}$, $V_{bc}$ and $V_{ca}$ are also applied to respective integrator circuits 184, 186 and 188 in a manner as taught in the above referenced related application, U.S. Ser. No. 300,200 entitled, "Line-to-Line Voltage Reconstruction For Synchronizing Thyristor Power Converter". The integrators are adapted to generate pseudo-flux wave signals $\psi_{ab}$, $\psi_{bc}$ and $\psi_{ca}$. The pseudo-flux wave signals are coupled to phase lock loop circuitry 190 which operates to derive a DC speed output signal (SPEED) inasmuch as the frequency of the pseudo-flux waveforms are inversely proportional to motor speed when referenced to the load side converter 14. Accordingly, a comparator circuit 192 compares the DC speed signal against a speed reference signal and is adapted to output an overspeed detection signal on lead 194 to the Hardware Fault Port. The system additionally includes two 70 volt DC supplies which are utilized by the source side and load side converters. Each of these voltages are adapted to be monitored by a comparator 163 and reference voltage (P.S. REF) and is adapted to provide a signal for an undervoltage condition on line 165 coupled to the Hardware Fault Port.

Additionally, the Hardware Fault Port for the load side microcomputer 36 is adapted to accept two input signals corresponding to a stall (STALL) of the source side microcomputer 34 on line 196 and the signal on line 198 corresponding to a no start (NO START), meaning that the drive is instructed to run, that the field current is being applied to the motor 10, but there is no motor rotation. With respect to the Hardware Fault Port for the source side microcomputer 54, it includes a signal applied thereto on line 200 which is indicative of a ground fault which can be derived from source line voltages and compared to a DC reference, not shown.

Additionally, the pseudo-flux waveforms $\psi_{ab}$, $\psi_{bc}$ and $\psi_{ca}$ are fed to a multiplexer 202, the output of which is coupled to an analog to digital converter 204. The output of the A/D converter 204 is provided to the appropriate microcomputer for implementing synchronization and commutation control of the thyristor bridges in the converters 12 and 14 in accordance with respective computer software contained therein. Typically, such control is disclosed in U.S. Ser. No. 330,933, entitled, "Flux Feedback Firing Control For A Load Commutated Inverter".

With respect to hardware detected faults, the present invention is adapted to classify hardware faults into two classes. Class 1 faults are those which are detected and considered so critical that the required protective action, such as a trip of the appropriate switchgear 18, 20 or 22 or firing of a cell is taken irrespective of current microcomputer operational status; however, signals indicating these faults are also furnished to the appropriate microcomputer 34 or 36 for parallel protective action and diagnostic output to indicator means such as visual display 70 and/or printer 72. Class 2 hardware faults are detected by the hardware of the sensor assemblies 46 and 48 but provide signal inputs only to the appropriate microcomputer which then operates to command and effect the appropriate protective action. A listing of typical hardware faults adapted to be detected and protected from by the subject invention are shown in the following table I.

TABLE I

| HARDWARE DETECTED FAULTS | | |
|---|---|---|
| Fault | Fault Class | Microcomputer Responding |
| SOURCE UNDERVOLTAGE | 2 | SOURCE - 34 |
| FIELD LOSS | 2 | SOURCE - 34 |
| SOURCE OVERVOLTAGE | 2 | SOURCE - 34 |
| SOURCE OVERCURRENT | 1 | SOURCE - 34 |
| SOURCE UNDERVOLTAGE OF 70 VOLT SUPPLY | 2 | SOURCE - 34 |
| LOAD MICROPROCESSOR STALL | 2 | SOURCE - 34 |
| FAULT IN EXCITER VOLTAGE CONTROLLER | 2 | SOURCE 34 |

TABLE I-continued

HARDWARE DETECTED FAULTS

| Fault | Fault Class | Microcomputer Responding |
|---|---|---|
| SOURCE CELL OVERVOLTAGE | 1 | |
| LOAD CELL OVERVOLTAGE | 1 | |
| FIELD OVERCURRENT | 2 | LOAD - 36 |
| LOAD OVERVOLTAGE | 1 | LOAD - 36 |
| LOAD UNDERVOLTAGE OF 70 VOLT SUPPLY | 2 | LOAD - 36 |
| LOAD OVERCURRENT | 1 | LOAD - 36 |
| MOTOR OVERSPEED | 1 | LOAD - 36 |
| SOURCE MICROPROCESSOR STALL | 2 | LOAD - 36 |
| NO START | 2 | LOAD - 36 |
| GROUND FAULT | 2 | LOAD - 36 |

As shown in FIG. 1 and as previously noted, there are three switchgear elements 18, 20 and 22 included in the subject protective system. The elements are provided, for example, for respectively disconnecting the six pulse source converter 12 from the 60 Hz supply, to disconnect the six pulse load converter 14 from the motor 10 and to disconnect the field exciter 16 from its 60 Hz source.

It should also be noted that each of these elements is comprised of circuit breakers or interrupters which have a "trip" and a "close" circuit enabled through an AND logic relay circuit, not shown. Software contained in the microcomputers 34 and 36 generate permissive controls which allow each of these switchgear elements to be closed by controlling one set of relay contacts which is series connected in each of the close circuits. The software also controls a relay contact which is series connected for each of the trip circuits. Additionally, class 1 hardware detected faults also control individual relay contacts in the trip circuit. Accordingly, when either the source or load microcomputers 34 and 36 detects a fault while executing high speed foreground programs, they can take immediate action by calling both converters 12 and 14 to inversion limit to get the current down in the DC link circuit 28. Relatively lower speed background programs in both the source and load computers continuously check whether any of the several faults have been detected in the foreground programs. For example, the load side background program microcomputer 36 communicates to the source microcomputer 34 if it has detected any faults while the source background program, in microcomputer 34, upon receiving a fault from the load microcomputer 36, issues a system fault signal which is furnished to the software logic controlling the software controlled relay contacts in the trip circuit for the source side circuit breaker 18, the load side circuit breaker 20 and the field circuit breaker 22.

With respect to software detected faults, the source or load microcomputer 34 and 36, upon detecting a fault, takes immediate action by calling both converters 12 and 14 to the inversion limit, i.e. commanding all the cells in thyristor bridge to fire at full retard, which action causes the current in the DC link circuit 28 of FIG. 1 to immediately start to decrease to zero. The memory 38 as shown in FIG. 1 among other things, is adapted to store a multi-bit word (16 bits) wherein each bit represents a separate call to inversion limit for a different fault which is detected and whenever, for example, a logic 1 occurs in any bit location, a command for firing both the source and load converters 12 and 14 at full retard is read by both computers 34 and 36 and a command issued. In most cases, following a fault bit being set, each bit can be cleared only by the respective microcomputers setting the bit.

With respect to the software detected faults which are adapted to be implemented by the subject invention, a tabulation of typical faults is shown in the following table II.

TABLE II

SOFTWARE DETECTED FAULTS

| FAULT | RECOVERY ATTEMPTED | MICROCOMPUTER RESPONDING |
|---|---|---|
| SOURCE CONVERTER COMMUTATION FAILURE | YES | SOURCE - 34 |
| SOURCE CONVERTER SHOOT THROUGH | YES | SOURCE - 34 |
| SHORTED LEG IN SOURCE CONVERTER | NO | SOURCE - 34 |
| LOAD CONVERTER COMMUTATION FAILURE | YES | LOAD - 36 |
| LOAD CONVERTER SHOOT THROUGH | YES | LOAD - 36 |
| SHORTED LEG IN LOAD CONVERTER | NO | LOAD - 36 |
| SOURCE PHASE LOCK LOOP OUT OF TOLERANCE | YES | SOURCE - 34 |
| LOAD PHASE LOCK LOOP OUT OF TOLERANCE | YES | LOAD - 36 |
| SOURCE OVERCURRENT | YES | SOURCE - 34 |
| LOAD OVERCURRENT | YES | LOAD - 36 |
| SOURCE ROM FAULT | NO | SOURCE - 34 |
| SOURCE RAM FAULT | NO | SOURCE - 34 |
| SOURCE MICROCOMPUTER FAULT | NO | SOURCE - 34 |
| LOAD ROM FAULT | NO | LOAD - 36 |
| LOAD RAM FAULT | NO | LOAD - 36 |
| LOAD MICROCOMPUTER FAULT | NO | LOAD - 36 |

With respect to the various hardware and software detected faults, and although some redundancy in description will appear, the following is intended to provide a brief summary of each fault and the action taken in response thereto. Considering first the hardware detected faults:

(a) Source Undervoltage—This fault results from the summation of the absolute values of the three phase source side line to line voltages $V_{abs}$, $V_{bcs}$ and $V_{cas}$ when compared to a DC reference (UV REF) of, for example, 0.7 per unit (p.u.). The comparator output is time delayed and sent to a hardware fault input port 49 for the source computer as shown in FIG. 1. This signal is ANDed with the source breaker interlock, not shown, associated with the circuit breaker 18. If the circuit interrupter 18 is closed and an undervoltage exists, then firing of the source side converter 12 is inhibited and associated cross-over and pulse train limit interrupt programs, to be referred to subsequently, are disabled. The load side converter 14 is sent to its inversion limit and any undervoltage fault of the 70 volt power supply voltage is ignored for the next six load side firings. Field exciter 16 also receives a fault signal from the microcomputer 34 to reduce field excitation by means of digital to analog converter 43.

When the undervoltage fault clears, if control power had also been lost, then a power applied reset signal is generated and is applied to the microcomputers 34 and 36 which temporarily inhibits any STALL fault from being generated and sends both microcomputers through respective initialization procedures, not shown, after which the stall lines are re-enabled. If control power had not been lost on main undervoltage fault, then after the undervoltage fault clears, the thyristor firings are re-enabled. After the undervoltage clears, the field voltage command is also ramped up to its operating value. Also, source and phase lock loop synchronization is reestablished through the microcomputers 34 and 36 in accordance with teachings provided by U.S. Ser. No. 364,453, and now U.S. Pat. No. 4,443,747, entitled, "Transitioning Between Multiple Modes Of Inverter Control In A Load Commutated Inverter Motor Drive". Associated with the detection of a source undervoltage fault, the microcomputer 34 furnishes a suitable indication to the display 70 and an alarm message is printed on printer 72.

(b) Field Loss—This hardware detected fault results from comparing a DC value corresponding to the motor field current $I_f$ which is derived by rectifying the exciter primary current and which is thereafter compared to a DC reference ($I_f$REF) as shown in FIG. 3. If the field current is less than the reference, assuming that the field exciter circuit breaker 22 is closed, then a field loss fault is sent to the source side microcomputer 34 through the hardware fault port 49. Once a system fault is declared, both inverters 12 and 14 are brought to inversion limit and the load side circuit breaker 20 is tripped by the microcomputer 36. A field loss designation is inputted to and displayed by the display unit 70 while a fault message is provided on the printer 72.

(c) Source Overvoltage—A source overvoltage fault results from a summation of the absolute value of the three phase line to line voltages $V_{abs}$, $V_{bcs}$ and $V_{cas}$ such as shown in FIG. 3, compared to a reference which when passed through an adjustable delay, comprises a fault signal passed to the source computer 34 through the hardware fault port 49. When a system fault is declared, both converters 12 and 14 are brought to inversion limit and all three circuit breakers 18, 20 and 22 for the source, load and field are tripped. A source overvoltage indication is provided on the display 70 and the corresponding fault message is sent to the printer 72.

(d) Source Overcurrent—A source overcurrent fault is detected upon the summation of the absolute values of the three phase source line currents $I_{as}$, $I_{bc}$ and $I_{cs}$ compared to a DC reference and fed to, for example, a 20 millisecond filter circuit as shown in FIG. 3 by reference numeral 154. If the source side current exceeds the reference for 20 milliseconds, for example, a fault signal is sent directly to the AND circuit for the source side circuit breaker 18 which activates the trip circuit. The fault is also coupled from the fault port 49 to the source side microcomputer 34 which communicates with the load side microcomputer 36, calling their respective converters 12 and 14 to inversion fault. Simultaneously tripping commands are also issued for the load and field circuit interrupters 20 and 22. This fault is suitably displayed on the display 70 and a printer output thereof is provided by the printer 72.

(e) Source Undervoltage of 70 Volt Supply—In the event that the 70 volt DC supply which is utilized in the firing circuits, not shown, for the converter 12 falls below a preset reference, a logical signal is provided for example on line 165 (FIG. 3) to the hardware fault port 49 which is coupled to the source side microcomputer 34. The microcomputer 34 immediately calls the source side inverter 12 to an inversion fault and in the event that the source undervoltage fault is not present, then a system fault is issued which latches in software in the microcomputer 34. This is communicated to the load side microcomputer 36 which in turn operates to call the load side converter 14 to an inversion limit. Thereafter both the load and field circuit interrupters 20 and 22 are tripped. The appropriate display is rendered and the printer 72 prints out the appropriate message.

(f) Load Side Microcomputer Stall—The load side microcomputer 36 includes a timer, which if it does not get pulsed at a sufficient rate by a software clock, not shown, produces a stall signal which is sent to the source side microcomputer 34 which declares a system fault. The source side microcomputer 34 advises the load side microcomputer 36 and both microprocessors then respectively order the converters 12 and 14 to inversion limit after which a tripping of the motor and field circuit breakers 20 and 22 is effected. An indication of the load side microcomputer stall is rendered on the display 70 and the corresponding message is printed out by the printer 72.

(g) Exciter Voltage Control Fault—In the event that the voltage control of the exciter 16 indicates a fault, a hardware detection of this fault is made which communicates to the microcomputer 34, causing the fault to be latched in software which thereafter causes both converters 12 and 14 to be called to the inversion limit followed by a tripping of the load and field circuit breakers 20 and 22. Again, the display 70 provides a visual indication of this fault which is accompanied by a print out provided by the printer 72.

(h) Source Cell Overvoltage—This hardware detected fault results from comparing the voltage across each thyristor cell of the source side converter against a DC reference and fires that cell with the overvoltage directly; however, the allowable repetition rate of firing is limited to insure the firing circuit is adequately charged between firings and thus a firing of a thyristor cell occurs each time an overvoltage is detected. This scheme for overvoltage protection is more fully described and claimed in U.S. patent application Ser. No. 284,070, entitled, "Overvoltage Protection Circuit", by G. R. E. Lezan, filed July 16, 1981 and assigned to the assignee of the present invention. No indication via the display 70 or the printer 72 is provided for this type of fault, inasmuch as firing of a cell with overvoltage may possibly result in a diametric fault or shoot through which is responded to by way of a software detected fault to be later described.

(i) Load Cell Overvoltage—This hardware detected fault is similar to (h) and results from comparing each cell voltage of the load side converter 14 against the DC reference and fires the cell with the overvoltage. However, the allowable repetition rate of firing is limited to insure the firing circuit is adequately charged between firings and thus a firing of a thyristor cell occurs each time an overvoltage is detected. No indication via the display 70 or the printer 72 is provided for this type of fault, inasmuch as firing of a cell with overvoltage may possibly result in a diametric fault or shoot through which is responded to by way of a software detected fault.

(j) Field Overcurrent—Where a field overcurrent fault is to be detected, the rectified exciter current is compared to a DC reference which comparison signal is sent to the load side microcomputer 36 where it is ORed with any other fault detected in the load computer software and then sent to the source side microcomputer 34. The source computer then issues a fault which gets latched in software whereupon both converters 12 and 14 are called to inversion limit accompanied by trips of the load and field interrupters 20 and 22.

(k) Load Overvoltage—This fault results from a summation of the absolute value of the three load side line to line voltages $V_{abl}$, $V_{bcl}$ and $V_{cal}$, which summation is compared to a DC reference. This fault is directly wired to the AND circuit for the source side circuit interrupter 18 trip circuit, but is also furnished to the load side microcomputer 36. In the microcomputer 36, it is ORed with any other faults detected in the load software which then communicates with the source side microcomputer 34 causing the software to latch in both microcomputers which thereafter calls for both converters 12 and 14 to inversion limit and which is followed by a tripping of the load and field circuit breakers 20 and 22. This fault is sent to the visual display 70 and a printed message indicative thereof is provided by the printer 72.

(l) Undervoltage of Load Side 70 Volt Supply—This fault detection is identical to the detection (e) of the source side 70 volt supply undervoltage fault and comprises a fault which is sent to the load side microcomputer 36. If the source side undervoltage fault is also indicated, then a system alarm is issued and both converters 12 and 14 are called to their inversion limit. If a source side undervoltage does not simultaneously exist, then inversion limit is called and the load and field circuit breakers 20 and 22 are tripped. The appropriate indication is displayed via the display 70 and a print out is provided by the printer 72.

(m) Motor Overspeed—This fault is provided by sensing the zero crossings of the three pseudo-flux waves $\psi_{ab}$, $\psi_{bc}$ and $\psi_{ca}$. The frequency is six times the fundamental frequency of the load and is therefore a function of the motor speed. This signal, when converted to a DC voltage and compared to a DC reference, is adapted to provide a motor overspeed fault detection. The occurrence of this fault is directly wired to the AND circuit for the field exciter circuit breaker 22 which is caused to trip. However, it is also fed to the load side microcomputer 36 where it then sends the fault indication to the source side microcomputer 34 which calls both converters 12 and 14 to their inversion limit and issues a trip command signal to the load circuit interrupter 20.

(n) Source Side Microcomputer Stall—The source side microcomputer 34 includes a timer means which, as in the case of the load side microprocessor, if it does not get pulsed at a sufficient rate, then the hardware stall signal generates a class 1 fault which immediately trips the source, load and field circuit breakers. Also the indication of a stall is sent to the load side microcomputer 36 which gets combined with any load side software detected faults and sent to the source side microcomputer 34 which calls both inverters to inversion limit.

(o) No Start—A no start fault exists if the motor exciter current has exceeded some DC reference and the analog speed signal is less than some low speed DC reference value for some specified time; e.g., one minute, after the drive has been commanded to run by issuance of a permissive signal from the load side microcomputer 36, at which time a no start signal is generated. This signal is read by the load side microcomputer 36 which is then passed to the source side microcomputer 34 which issues a system fault which is thereafter latched in software and whereupon both converters 12 and 14 are called to inversion limit with an accompanying tripping of the load and field circuit interrupters 20 and 22.

(p) Ground Fault—A ground fault detection results from a summation of the source side line to line voltages $V_{abs}$, $V_{bcs}$ and $V_{cas}$, passed through a shaped filter network and there the absolute value is compared to a DC reference which is adapted to indicate a ground fault. A logic signal is generated therefrom which is read by the load side microcomputer 36 and passed over to the source side microcomputer 34, which issues a command for an inversion limit of both converters 12 and 14 and operates to trip the source, load and field circuit breakers 18, 20 and 22. This type of ground fault is displayed via the display means 70 shown in FIG. 1 and a print out of the fault message is provided by the printer 72.

As is apparent from the foregoing, software in microcomputers 34 and 36 operates to, inter alia, call both converters 12 and 14 to their respective inversion limit. Furthermore, with respect to software detected faults, there is a 16 bit word located in the memory 38 shared by the two microcomputers 34 and 36 to store a digital word defined as INVLIM, meaning that the inversion limit is to be called in the event that any bit is set, for example, to a digital "one" state. The various bit positions are identified by the tabulation shown in the following table III which also indicates the action which sets the particular bit of the INVLIM word.

TABLE III

| | INVERSION LIMIT (INVLIM) | |
|---|---|---|
| BIT POSITION | INVLIM BIT NAME | ACTION WHICH SETS BIT |
| 0 | INVFAULT SOURCE | Source Side Software Detects A Source Converter Commutation Failure |
| 1 | INVFAULT LOAD | Load Side Software Detects A |

TABLE III-continued

INVERSION LIMIT (INVLIM)

| BIT POSITION | INVLIM BIT NAME | ACTION WHICH SETS BIT |
|---|---|---|
| | | Load Converter Commutation Failure |
| 2 | SHTHR SOURCE | Source Side Software Detects A Diametric Fault in Source Converter |
| 3 | SHTHR LOAD | Load Side Software Detects A Diametric Fault In Load Converter |
| 4 | REVERSE CURRENT SOURCE | Source Side Software Detects A Shorted Source Converter Bridge Leg |
| 5 | REVERSE CURRENT LOAD | Load Side Software Detects A Shorted Load Converter Bridge Leg |
| 6 | OVERCURRENT SOURCE | Source Side Software Detects An Overcurrent Based On Source Current |
| 7 | SOURCE SIDE UNDERVOLTAGE | Source Side Software Detects An Undervoltage |
| 8 | START UP | Insures Drive Starts Up Or Shuts Down In Inversion Limit Status |
| 9 | SPARE BIT | N/A |
| 10 | OVER CURRENT LOAD | Load Side Software Detects An Over Current Based On Load Current |
| 11 | S FLAG SOURCE | The Source Side Phase Lock Loop Is Out Of Tolerance |
| 12 | S FLAG LOAD | The Load Side Phase Lock Loop Is Out Of Tolerance |
| 13 | CROW BAR FLAG | All Load Side Cells Are Fired When Load Breaker Is Opened |
| 14 | FIRST PASS IN RUN FIRE | First Pass In Self Commutation Mode After Transition From Forced Commutation Mode |
| 15 | NEVER FIRE | Shorted Bridge Leg Or Memory Stack Overflow In Either Converter |

Figure 4A:
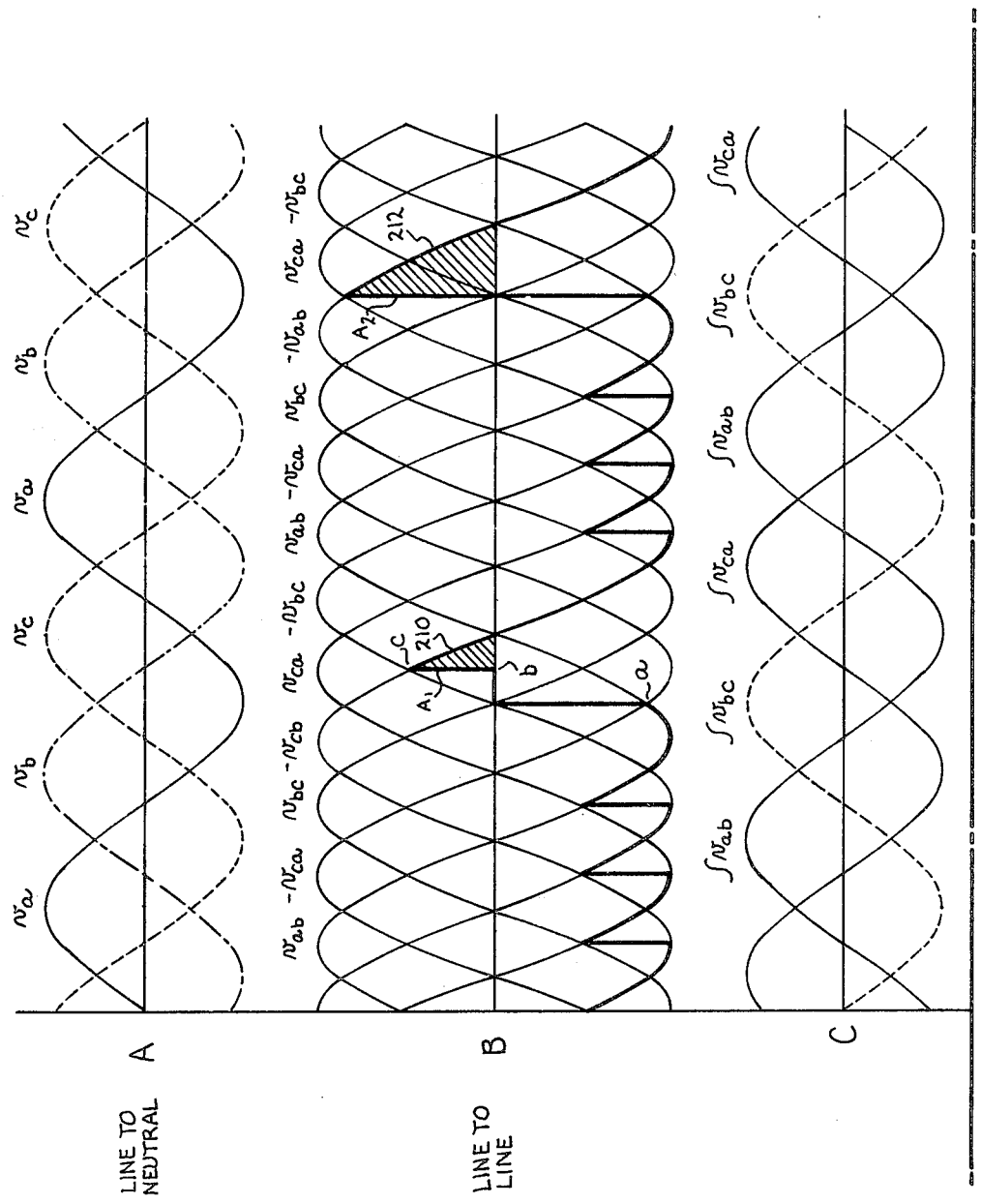
FIGS. 4A and 4B and 4C and 4D taken together as shown comprise a set of time related waveforms and diagrams helpful in understanding the operation of the subject invention.
Figure 4B:
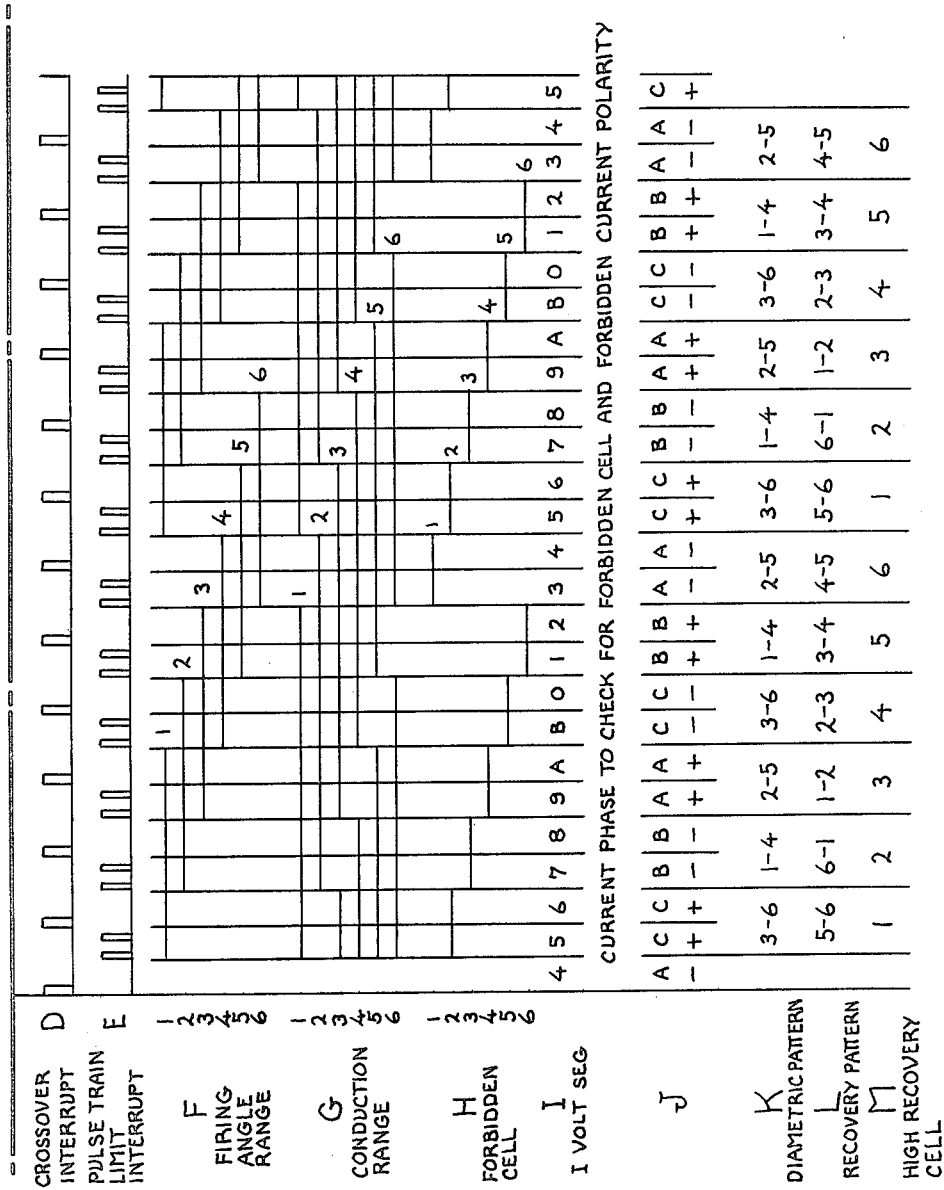

With respect to the various software detected faults, they can briefly be described as follows:

(a) Source Converter Shoot Through—Source converter shoot through or diametric conduction comprises a current conducting fault for two diametrically opposite thyristor cells, for example cells 1 and 4, cells 3 and 6 or cells 5 and 2 as shown in FIG. 1. This type of fault is examined just prior to firing a new source cell by checking to see if both cell sensors for any one phase A, B or C indicates cell conduction. If such a fault is detected, the INVLIM bit 2 is set in the memory 38 by microcomputer 34 which is also read by microcomputer 36 and both converters 12 and 14 are called to inversion limit. The cell firing is controlled by a coordinated set of interrupt programs kept in synchronism by fluxwave zero crossings described, for example, in U.S. Ser. No. 333,933, entitled, "Flux Feedback Firing Control For A Load Commutated Inverter". A recovery flag is set following shoot through detection and appropriate firing pattern as illustrated in FIG. 4B, line 2 is selected to commutate the diametric fault. If the fault is eliminated, the corresponding INVLIM bit is cleared.

Figure 8A:
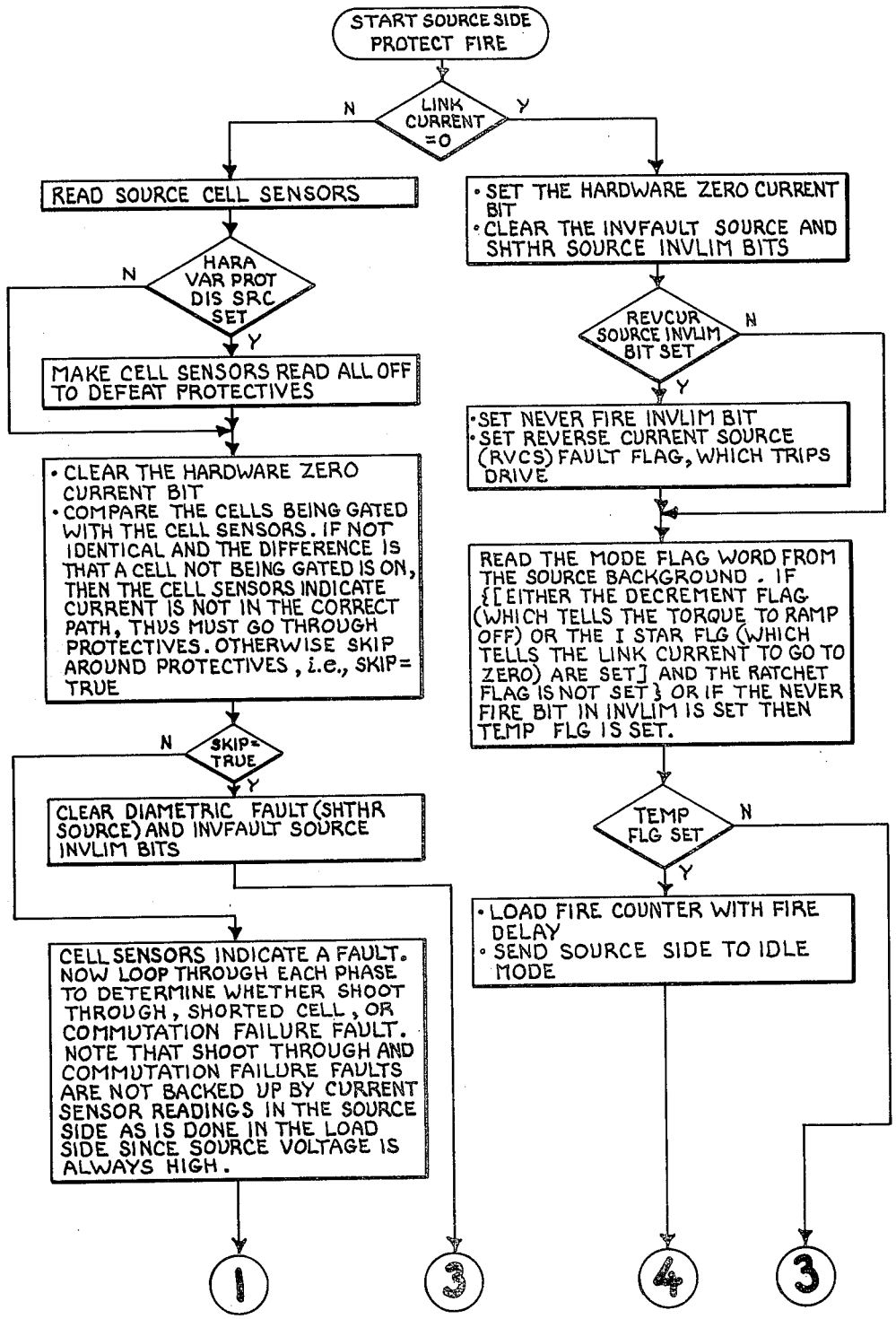
FIGS. 8A through 8C comprise a flow chart illustrative of the SOURCE PROTECT FIRE interrupt software routine included in the source side converter for partially implementing the predetermined protectives therein.
Figure 8B:
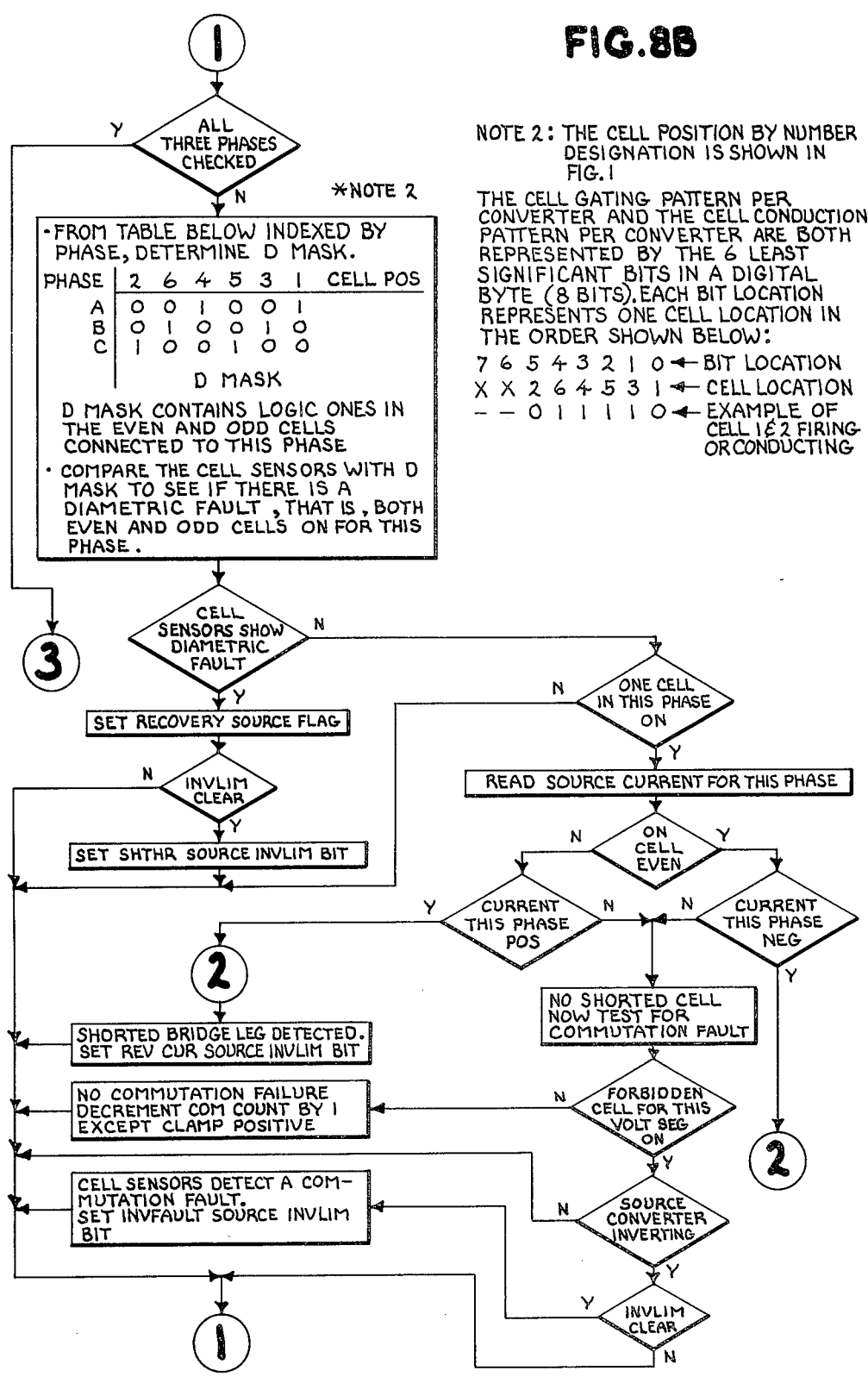

(b) Shorted Leg In Source Converter—This type of fault is also checked before each thyristor cell firing and consists in first determining that a fault exists but the fault is not a shoot through fault. The source line current polarities are then checked by the scheme described in FIG. 8B against the cell sensors to determine if any of the source side converter cells have reverse conduction. If reverse conduction has taken place in any cell, the INVLIM bit 4 is set, which commands both converters 12 and 14 to inversion limit. The occurrence of this bit being set however requires a subsequent system reset to clear the bit. When the DC link current $I_{DC}$, as derived from the source side current sensors 54, 55 and 56 reaches zero, the "never fire" INVLIM bit #15 is set which operates to cease firing all cells in both converters. Additionally, a flag is set causing a system fault to be issued which trips the source, load and field circuit breakers 18, 20 and 22. This type of fault is also accompanied by the visual display by the unit 70 and a print out by the printer 72.

Figure 6A:
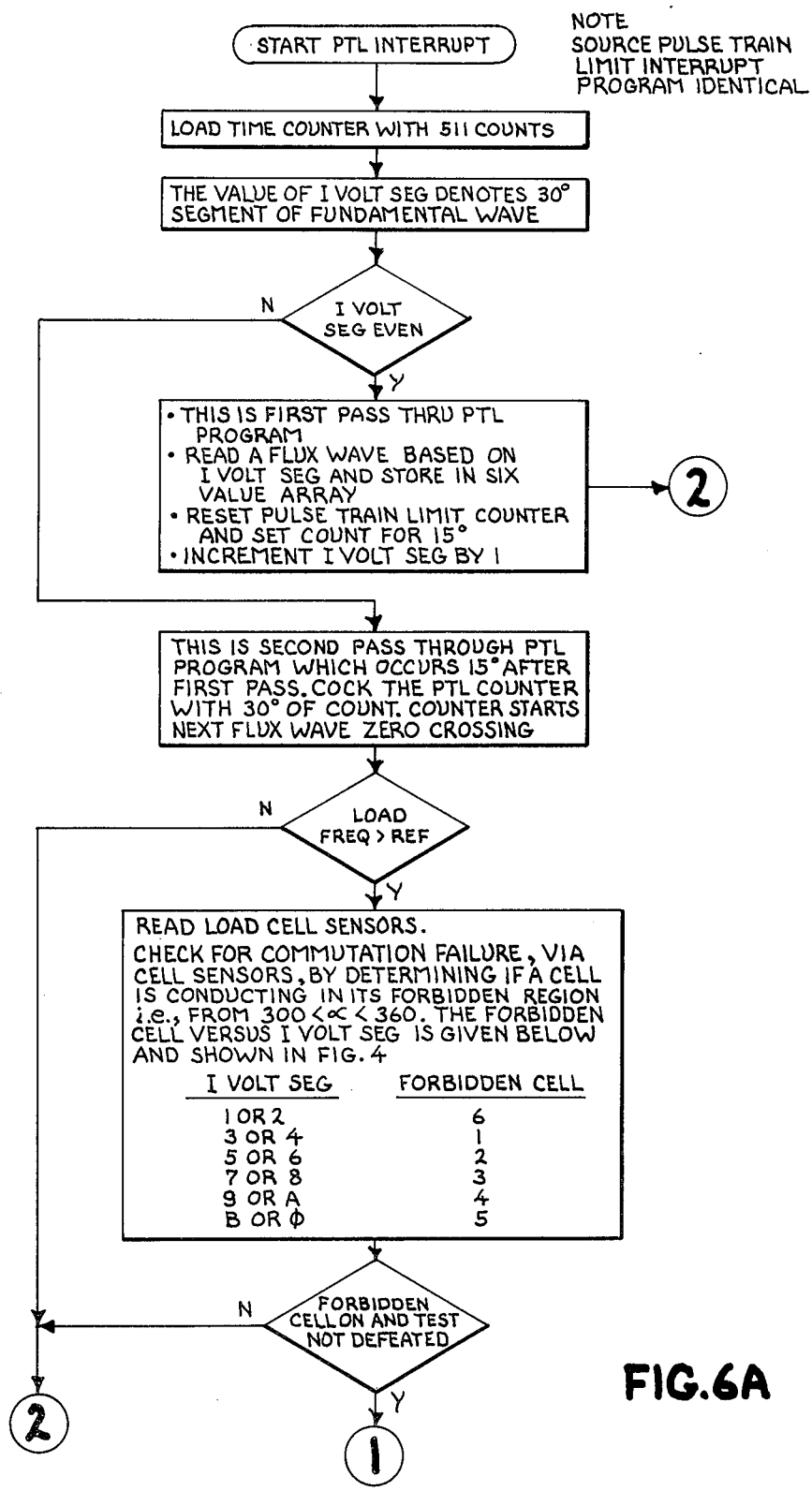
FIGS. 6A and 6B comprise a flow chart illustrative of the PULSE TRAIN LIMIT software routine included in the load side converter for partially implementing the protectives therein.
Figure 6B:
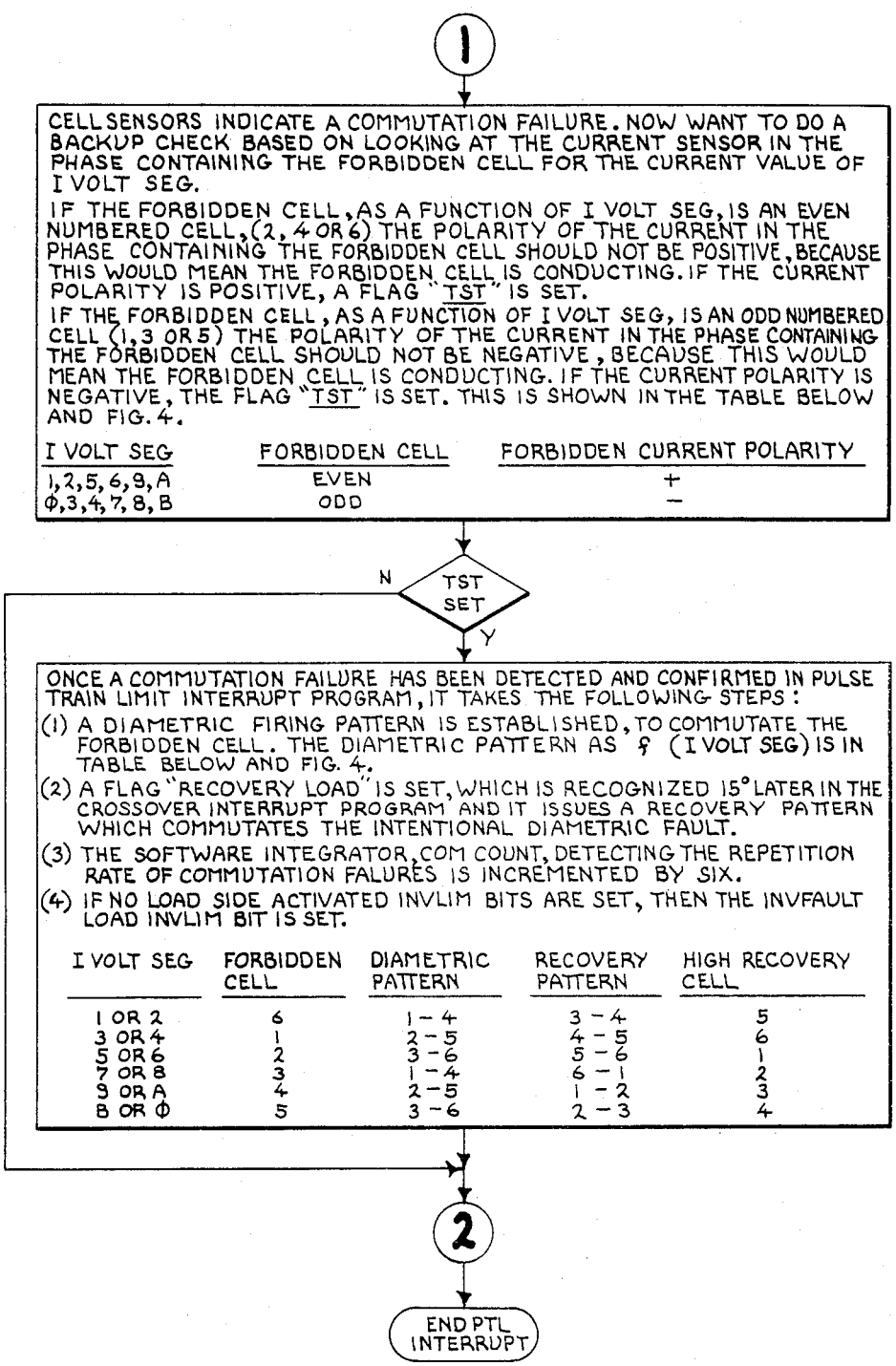

(c) Source Converter Commutated Failure—Source side converter commutation failure is checked at two different times in the source converter microcomputer 34 software control, once just before a source side cell firing as shown in FIG. 8B and again in the second pulse train limit program as shown in FIG. 6, which occurs 15° before any zero crossing of the pseudo-flux waves as shown in FIG. 4, lines C, D and E. In both these programs, commutation failure is first detected by reading the cell sensor port. This cell sensor reading requires little computer execution time. Only if the cell sensors indicate a probable commutation fault does the software confirm the fault with a current sensor reading. These current sensor readings are done via A/D readings which take relatively longer execution time and therefore are to be avoided unless necessary in order not to penalize the response of the control system. Detection is made in the event that the cell sensor circuitry (FIG. 2) indicates a fault but previous tests reveal that there is no shoot through or shorted cells and the cell sensors/current transformers indicate a forbidden cell conducting, that is, a cell is conducting in its $\alpha$ range of 300° to 360°.

Figure 4C:
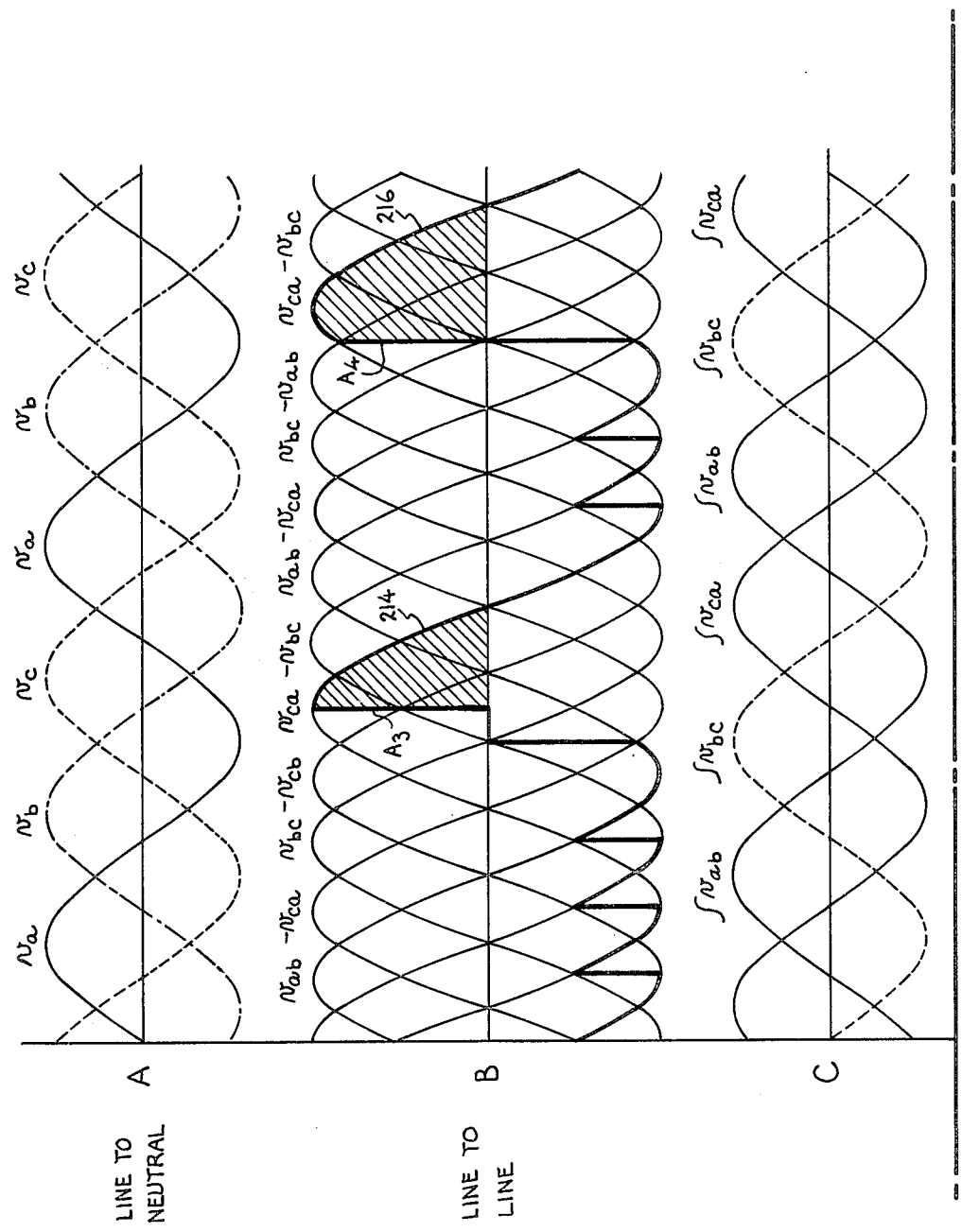
Figure 4D:
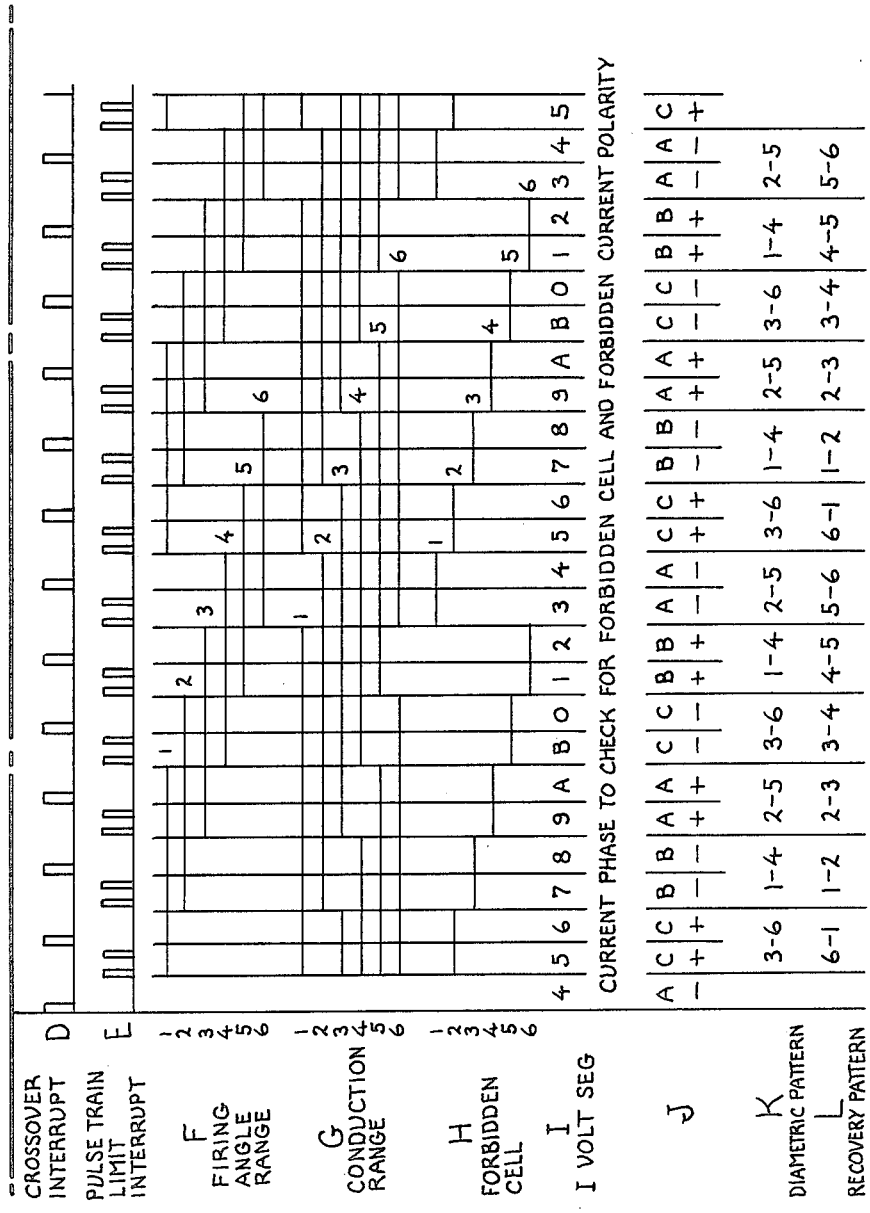

This range is shown by diagram H of FIG. 4B. If commutation failure is detected just before firing, the INVLIM bit #0 is set calling both converters to inversion limit. The bit, however, gets cleared when the DC link current $I_{DC}$ thereafter reduces to zero. When the commutation failure is detected 15° before a phase voltage crossing, then one of two courses of action can be taken as illustrated in FIG. 4A, line B, cases 210 and 212. The first is to fire an intentional diametric pattern, then 15° later fire a recovery pattern which commutates the intentional diametric. The alternate course of action would be to fire the recovery pattern immediately when the commutation failure is detected. There are actually four possible recovery patterns, two of which are shown in waveform set B of FIG. 4A and two of which are shown in FIG. 4C. These four cases are referenced by numerals 210, 212, 214, 216 respectively. The volt second area available for commutating the fault is shown as $A_1$, $A_2$, $A_3$ and $A_4$ in 210, 212, 214, 216, respectively. Note that $A_4 > A_3 > A_2 > A_1$, meaning that the recovery scheme of 216 provides the most volt seconds for commutating the faulted converter. However since the other converter has been sent to inversion limit when the fault was detected it is putting out a negative voltage at its P terminal (FIG. 1). However the faulted unit is transiently putting out a positive voltage on its P terminal. This causes a large recovery current to circulate between the two converters for the duration of the recovery. Thus the recovery scheme with the highest volt seconds for commutation also has the highest amplitude and duration of recovery current.

Figure 8C:
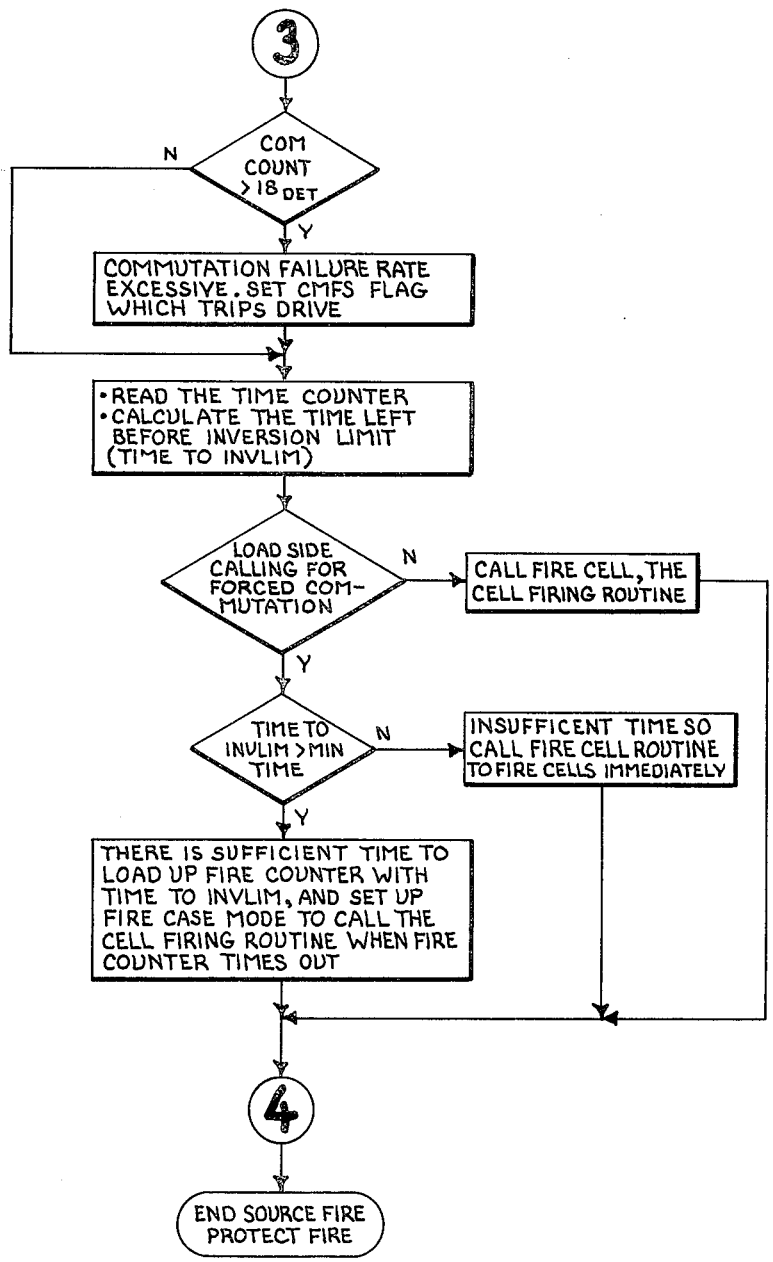
Figure 9:
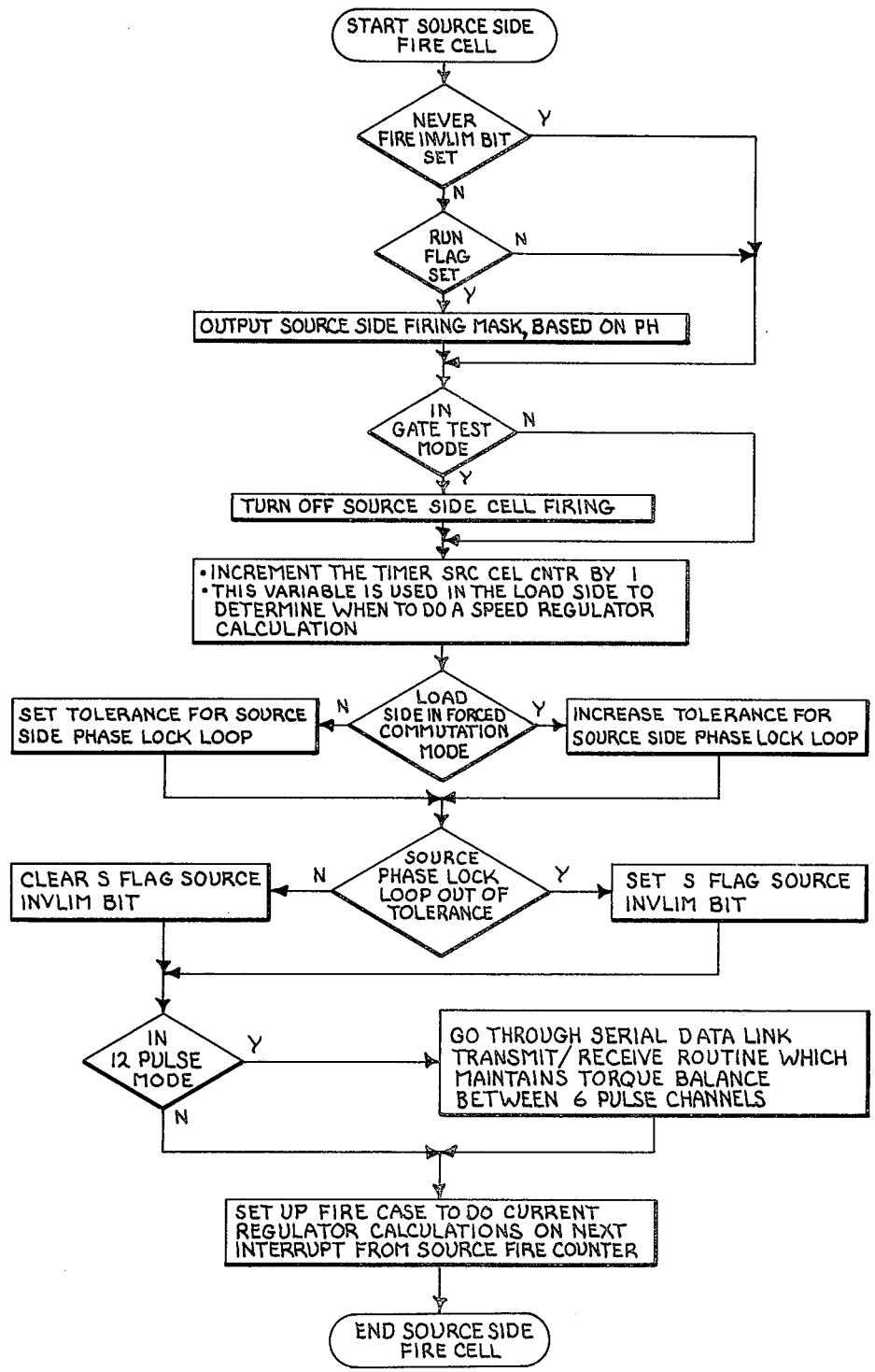
FIG. 9 comprises a flow chart illustrative of the SOURCE FIRE CELL INTERRUPT software routine included in the source side converter for further implementating predetermined protectives therein.

The primary difference between 210, and 214 and 212 and 216 is that the recovery pattern sequence 4B-L and 4D-1 as a function of IVOLTSEG is advanced by 60° in 4D-L, thereby firing a pattern which gives more commutating volt seconds. Furthermore the high recovery cell is not checked in the scheme of 4C, 4D in the crossover interrupt program as discussed in FIG. 7, because in fact in the recovery method illustrated in FIGS. 4C and 4D, the high recovery cell is actually the one fired to affect the recovery. Regardless of the recovery technique the INVLIM bit #0 is set which calls for the converters 12 and 14 to inversion limit. Also, the software increments an integrator count by six counts for every commutation failure detected in these protectives. A single commutation failure should clear; however, if the commutation failure rate is excessive as determined by the COM COUNT integrator described in FIG. 8C, a system command is provided by the source side microcomputer 34 which causes a tripping of the motor and field circuit breakers 20 and 22. This is also accompanied by a visual indication on a display 70 as well as a print out by the printer 72.

(d) Load Converter Shoot Through—As in the case for shoot through fault detection on the source side, the load side converter 36 is examined for a shoot through or diametric fault just prior to firing a new load cell. Since cell sensors are adapted to indicate that such a fault may exist, the cell sensors are checked to see if both top and bottom cells in a phase A, B or C are conducting. If so, a double check is made based on comparing the magnitude of the load current in the two load phases being gated with the DC link current derived from the source side current sensors 54, 55 and 56. These two currents should agree within a predetermined bias margin, otherwise a load diametric fault is said to exist. If a diametric fault is confirmed and no other INVLIM bits have been previously set, the INVLIM bit #3 is set, which then calls both converters 12 and 14 to inversion limit. Also, if a diametric fault is confirmed, a recovery flag is set which gets recognized at the next load phase voltage zero crossing and calls a load firing pattern to be produced to commutate the diametric faults.

(e) Shorted Leg In Load Converter—This fault, as in (b) above, is detected in the software of the load side microcomputer 36. If the cell sensors in the sensor assembly 48 (FIG. 1) indicate that a fault exists, as described in FIG. 7B, and the sensors indicate no diametric fault, then a shorted leg test is made by comparing the load current sensor polarity vs. cell sensors for each phase. If a fault is detected, the INVLIM bit #5 is set, which thereafter calls both converters 12 and 14 to inversion limit. Once the link current reaches zero, the "never fire" INVLIM bit #15 is set which again causes all cell firing in both converters to cease. Also a fault flag is set which calls a system fault which gets latched in the software of the source side converter 34 and accordingly trips the load and field circuit breakers 20 and 22. This fault is furthermore outputted to the display 70 as well as the printer 72.

(f) Load Converter Commutation Failure—As in (c), load side converter commutation failure is detected in two instances in the software contained in the load microcomputer 36, once just before firing a new cell and 15° before any phase voltage zero crossing. The detection 15° before crossover is identical to its counterpart in the source side microcomputer 34; however, the detection just before firing is somewhat different. If the load side cell sensors indicate a fault, and the load converter is inverting, i.e. $90° \leq \alpha \leq 180°$ then the polarity of the load current sensor signal in the phase not currently being gated is checked. This is the phase which contains the cell which should have just been commutated off by the latest cell firing. If it was not successfully commutated, a flag is set. A response to a load side converter commutation failure detected here is identical to that with respect to the source commutation failure, but the INVLIM bit is #1 is now set if no other INVLIM bits were previously set. The presence of a logical "one" sends both converters 12 and 14 to inversion limit. The response to a load commutation failure detected in the protectives which occur 15° before phase voltage zero crossings are identical to those for the source side commutation failure previously described.

(g) Source Overcurrent—This software fault parallels the corresponding hardware detected fault and is detected by way of the DC link current $I_{DC}$ derived from the source side microcomputer 34 and is read in during a current regulator program. The current command is limited to some per unit value such as 1.1-2.0-p.u. If the actual current exceeds some overcurrent limit value such as 1.75-3.0p.u., then the INVLIM bit #6 is set, which calls both inverters 12 and 14 to the inversion limit. When the DC link current reaches zero, the INVLIM bit #6 is cleared. When the same bit is set, however, a software integrator count is incremented by some value, for example six counts. Every pass through the current regulator program that the INVLIM bit is clear, but the current is greater than zero, will decrement the integrator count by one. When the integrator count exceeds another value, for example 18, this implies that the repetition rate of overcurrent is excessive and that a fault exists. A fault flag is set which is detected by the microcomputer 34 which issues a system fault and following calling both converters to inversion limit, trips the motor and field circuit breakers 20 and 22. This fault is fed to display unit 70 and a print out thereof is provided by the printer 72.

(h) Load Overcurrent—The DC link current $I_{DC}$ as derived from the load side current sensors 64, 65 and 66 is sampled by the load side microcomputer 36. If this current exceeds an adjustable per unit value, for example 1.75–3.0p.u., then an INVLIM bit #10 is set which acts to bring both converters to inversion limit. Bit #10 is cleared when the $I_{DC}$ link current goes to zero. Also, when the INVLIM bit #10 gets set, a software integrator count is incremented by some value, for example, six counts. This count is decremented by one every pass through the program that the subject INVLIM bit is clear and the link current is greater than zero. If the integrator count exceeds some count, for example 18, then a fault flag is set which is read by the load side microcomputer 36 which sends an indication to the source side microcomputer 34 which issues a system fault in causing a tripping of the load and field circuit interrupters 20 and 22.

(i) Source ROM Fault Or Load ROM Fault—Upon start-up or after any system reset, a check is made on the source side and load side ROM programs which are contained in the respective microcomputers 34 and 36 insofar as their respective initialization programs are concerned. If the check fails, a ROM fault is set and program execution will not proceed past initialization, no converter cells will be fired and no circuit breakers 18, 20 and 22 will be allowed to close. This fault is furnished to the display 70 and a corresponding print out provided by the printer 72.

(j) Source RAM Or Load RAM Fault—On start-up or after any reset, RAM memories, not shown, included within the microcomputers 34 and 36 have a value written, then read to each memory location which if each location checks correctly, the RAM is initially initialized to zero. If every location does not correctly check a RAM failure fault flag is set which will prevent further program execution and it will not proceed past initialization. This is also accompanied by an inhibiting of cell firing and circuit breaker closure, as above. As in the case for the ROM fault detection, a RAM fault is provided to the display 70 and the printer 72.

(k) Source Or Load Microcomputer Fault—On start-up or after any reset, the source and load side microcomputers 34 and 36 execute a number of other instructions. If these instructions are not successfully executed, a respective CPU fault flag is set whereupon program execution will not proceed past initialization, no cells will be fired in either converter 12 or 14, and the circuit breakers will not close.

(l) Phase Lock Loop Tolerance—In addition to the above noted faults, the software programs in the two microcomputers 34 and 36 are adapted to check for whether or not the source side phase lock loop and the load side phase lock loop are out of tolerance, which if they are, the INVLIM #11 or 12 respectively are set, whereupon the converters 12 and 14 are called to inversion limit until the out of tolerance condition is cleared.

Up to this point the INVLIM #7, #8, #9, #13, #14 and #15 have not been alluded to. As shown in Table III, bit #9 constitutes a spare bit. Bit #8 is a bit which insures drive start-up or shut down with an inversion limit condition of the converters 12 and 14. Bit #7 is set if a source side undervoltage is detected. This could be caused during the transfer from one source bus to another. Concurrently to setting INVLIM bit #7, the source side firing is inhibited and all source side interrupt programs, except the FIRE SERVICE interrupt program, are disabled until the undervoltage fault clears. Insofar as INVLIM bit #13 is concerned, it is set when all the load side thyristor cells are fired when the load side circuit interrupter is opened and when source side converter 12 is forced to the inversion limit. Bit #14 is utilized in an operational transition mode from forced commutation to self commutation as taught in the above referenced application, U.S. Ser. No. 364,453, and now U.S. Pat. No. 4,443,747, entitled, "Transitioning Between Multiple Modes of Inverter Control In A Load Commutated Inverter Motor Drive". This bit is merely set for the first pass in the self commutation mode, after which it is cleared.

Thus the INVLIM word is a 16 bit word in memory accessible to and adapted to be set or read by either the source side or load side microcomputers 34 and 36. A logic "one" in any INVLIM bit location, i.e. a non-zero value for the INVLIM word thereafter causes both source and load converters to fire at full retard. It should be noted that only bits #4, #5 and #15 require a system reset when set. Thus the objective of the INVLIM word in the common memory 38 is to rapidly reduce the DC link current to zero and can be invoked by intent or in response to a software detected fault. For certain faults, however, auxiliary fault flags are generated in parallel to the INVLIM bits such that even though the INVLIM bit resets when the fault clears, the drive status may depend on the response to this auxiliary flag. For example, this flag may latch and trip the drive entirely.

Figure 5A:
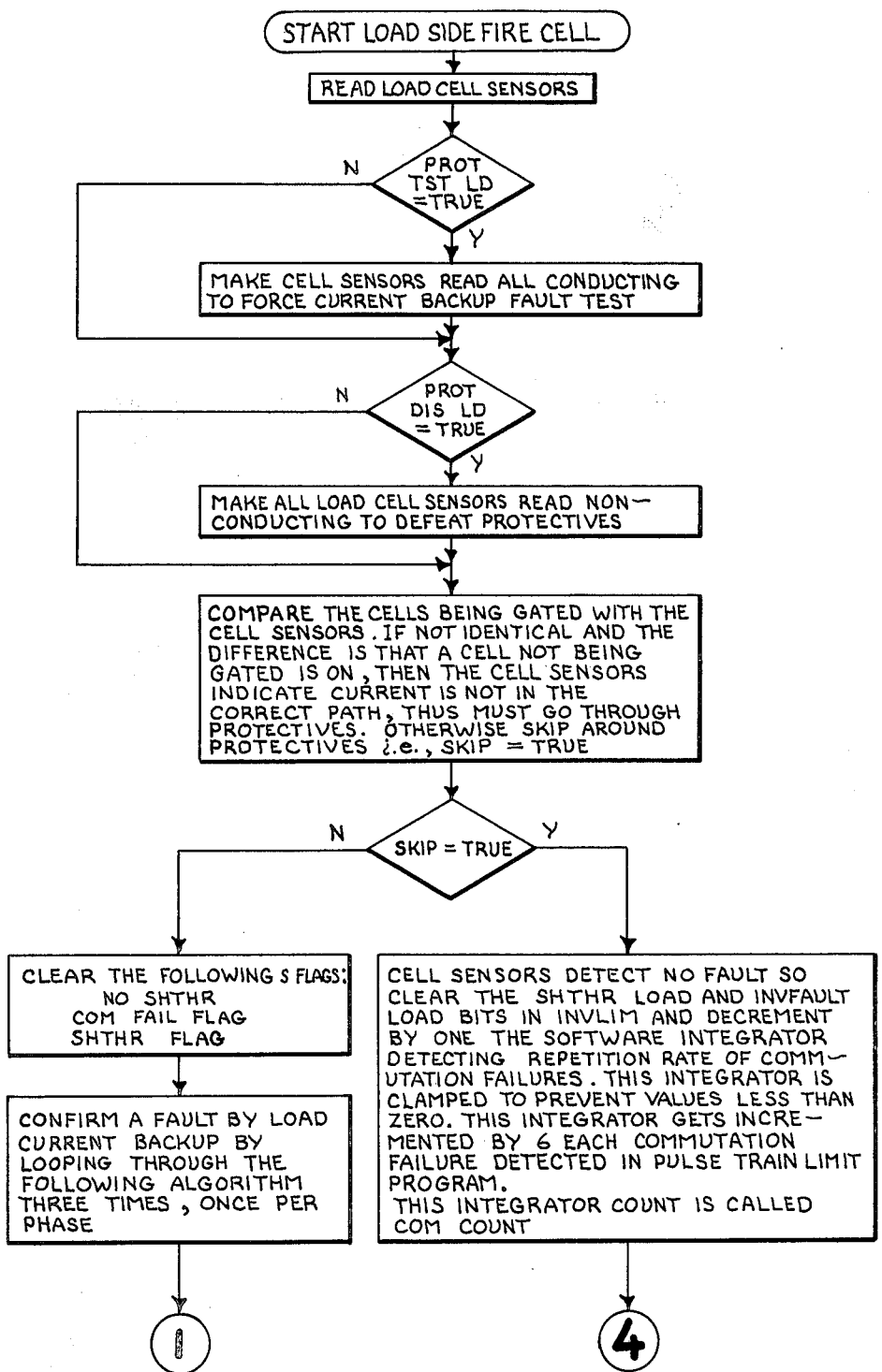
Figure 5B:
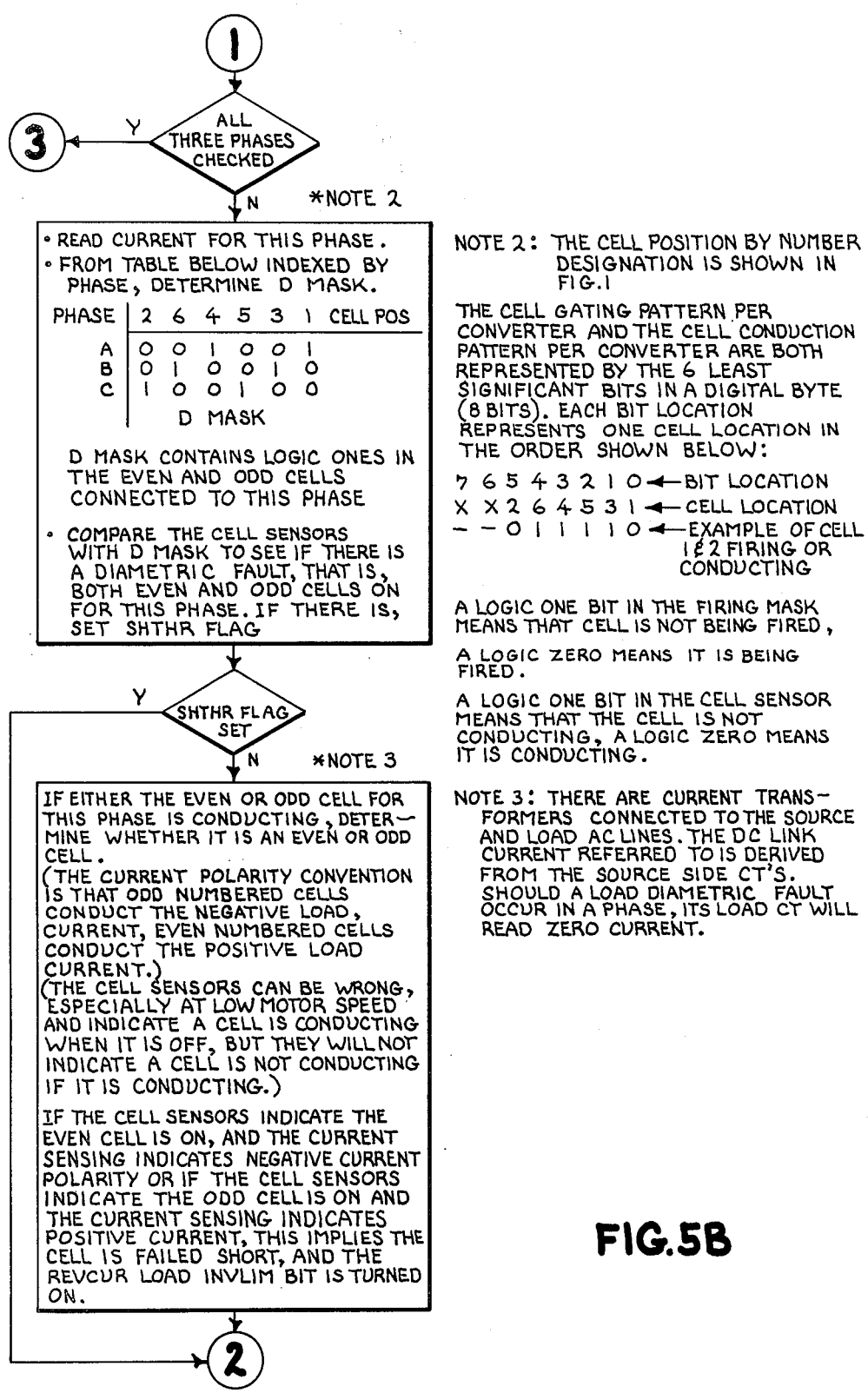
Figure 5C:
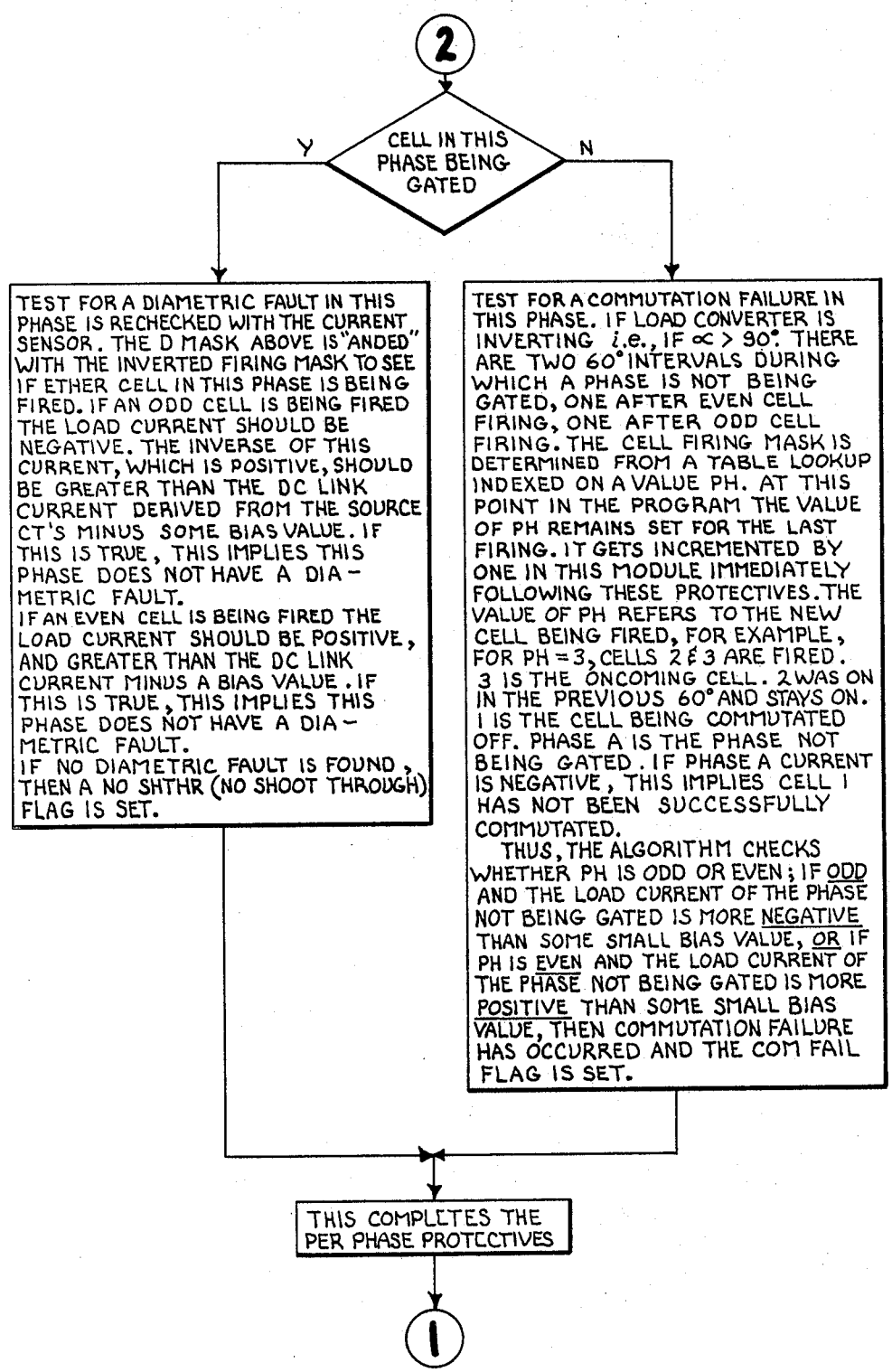
Figure 5D:
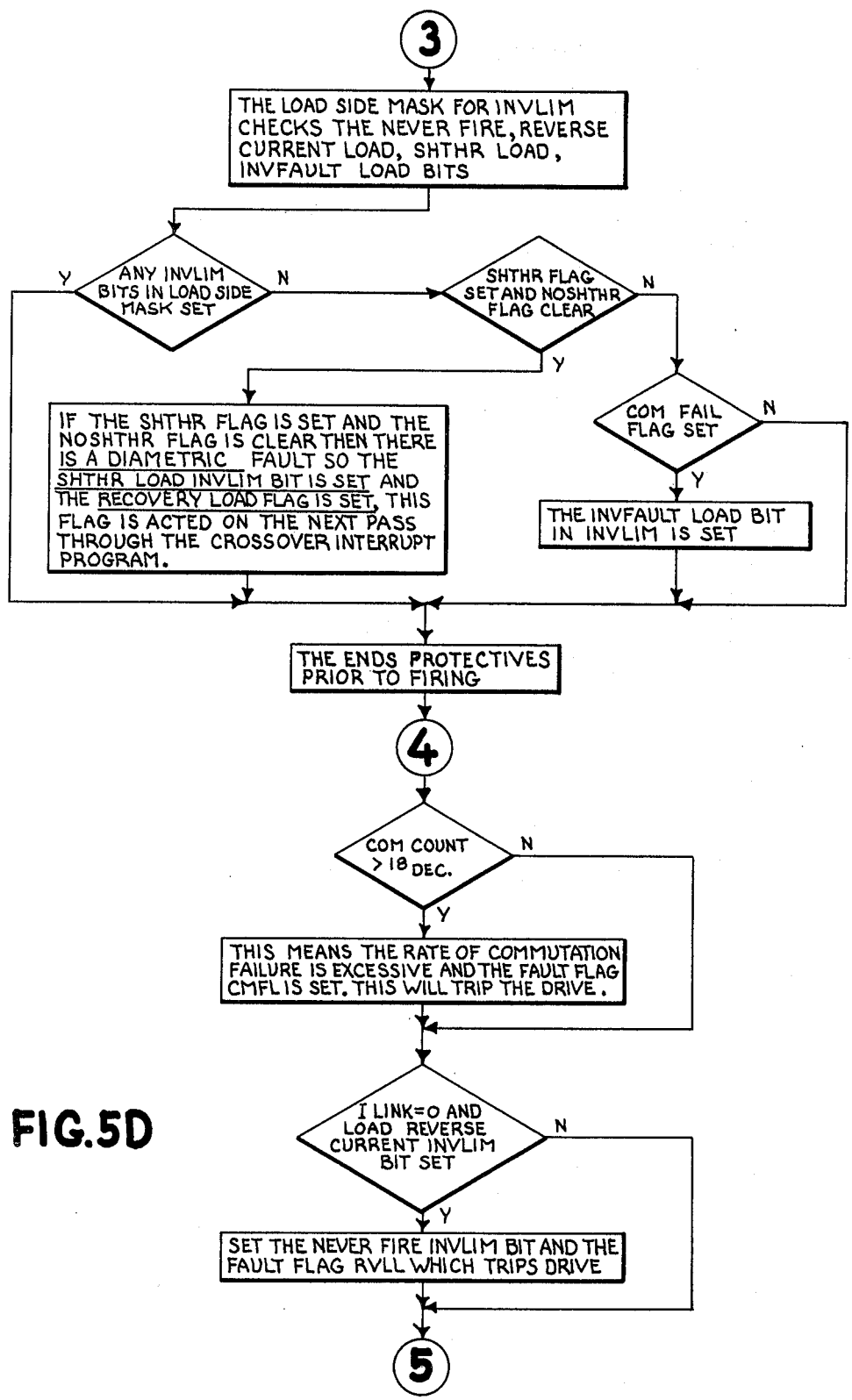

Further to the consideration of software detected faults, the primary faults detected thereby consists in commutation failure, shoot through and shorted cell (leg) faults which are performed for both the source side and load side converters 12 and 14 by means of the microcomputers 34 and 36, respectively. These protective checks are furthermore implemented in a number of separate instructional code sets or programs. For example, a LOAD PROTECT FIRE program is illustrated in flow chart form in FIGS. 5A-5C while identical SOURCE OR LOAD PULSE TRAIN LIMIT programs are illustrated by the flow chart of FIGS. 6A and 6B. Also identical SOURCE OR LOAD CROSSOVER programs are illustrated in FIG. 7. With respect to the source side microcomputer 34, it includes a protective program identified as the SOURCE SIDE PROTECT FIRE and SOURCE SIDE FIRE CELL programs which are illustrated by the flow charts of FIGS. 8A-8C and FIG. 9, respectively. Because the source voltage is relatively fixed and the load voltage can be relatively low at low motor speed, the LOAD SIDE PROTECT FIRE program is more complicated for the load side converter than the source side converter because in the load side converter, if the cell sensors indicate a conduction pattern fault, a double check is made by the load side current transformers to confirm the fault.

Inasmuch as the aforementioned programs occur just before the firing of a new cell and because the firing angle of any cell can vary over a 180° range, the aforementioned "fire" programs are interrelated with two other programs which are substantially identical to one another in both microcomputers 34 and 36 and which occur at a fixed time relationship relative to the respective terminal or line to line voltages and more particularly the integral of the line to line voltages which on the load side of the system are referred to as pseudo flux waves. These timing programs are the CROSS OVER INTERRUPT program shown in FIG. 7 and the PULSE TRAIN LIMIT program shown in FIGS. 6A and 6B, the latter occurring 45° after or 15° before the respective CROSS OVER INTERRUPT program. This time relationship is further illustrated in the waveforms A through E of FIG. 4.

Referring now to FIGS. 4A through 4D, the set of waveforms A correspond to the 3φ line to neutral voltages whereas waveform set B are illustrative of the line to line voltages derived therefrom. The waveform set C is indicative of the integral of the line to line voltage set B and from which pseudo flux waves are generated. Next waveform D is indicative of execution time of the CROSS OVER INTERRUPT program and which start at the crossover points of the integral of the line to line voltages corresponding to waveform set C. These pulses, moreover, occur at every 60°. Beneath the waveform D there is a second set of pulse waveforms E which correspond to the pulses for initiating the PULSE TRAIN LIMIT program.

The software protective programs as noted above are adapted to respond to the thyristor cell sensor signals which appear at an input port such as shown in FIG. 2 by reference numeral 136. The cell sensors are adapted to read the conduction state of the six cells in each converter by a cell voltage check. The protective programs, moreover, are adapted to implement a scheme which is further outlined by the diagrams F through M. As shown therein, diagram F is adapted to indicate the possible firing range per cycle of each of the six thyristor cells in each converter relative to the waveforms shown by the waveform sets A, B and C above. Diagram G on the other hand is adapted to illustrate the possible conduction range of each of the thyristor cells 1 through 6 relative to these voltage waveforms. Diagram H which is illustrated below diagrams F and G is indicative of the respective regions where cell conduction is forbidden and which provides means for checking each cell individually for conduction at an improper time and which is achieved by noting any forbidden current polarity whose proper polarity for any conduction time is illustrated in diagram J. Diagram K is intended to illustrate the deliberate diametric pattern, that is, provided as an output from the second pass in the PULSE TRAIN LIMIT program as a function of IVOLTSEG as a first step in recovery from a commutation fault. Diagram L, on the other hand, is illustrative of the recovery pattern to be initiated for any diametric fault detected. Finally, diagram M denotes the high recovery cell as a function of IVOLTSEG, that is, the cell that if turned on at this time would provide the maximum volt seconds for commutating the intentional diametric fault.

It can be seen with reference to the flow charts for the PROTECT FIRE and SOURCE FIRE cell program for the source side converter and the LOAD PROTECT FIRE program for the load side converter that a test is first made to determine whether or not a diametric or shoot through fault exists followed by a test for a shorted bridge leg and following that a test for commutation failure is conducted. In each case the appropriate INVLIM bit is set which is adapted to call both converters to inversion limit. Additionally, the PULSE TRAIN LIMIT program for both microcomputers checks to see if the commutation failure has occurred by determining if a cell is conducting in its forbidden region, i.e. in the alpha range of 300°-360°. If such a commutation failure is detected, one of two courses of action is called for. The first action involves calling both converters to the inversion limit, setting a recovery flag, issuing an intentional diametric firing pattern, followed 15° later in the crossover program by the recovery flag being detected regardless if it came from either the pulse train limit or the "fire" protective program. The CROSSOVER program thereupon issues a recovery firing pattern which commutates the intentional diametric pattern. This is illustrated by waveform 210 of FIG. 4. Considering for example that the load side inverter is inverting at 150° as shown, at point "a" cell 2 should have fired to commutate cell 6 off, but failed. At point "b", which corresponds to the second pass through the pulse train limit program for the load side inverter, the commutation failure is detected because cell 6 is conducting at IVOLTSEG=1 as indicated by diagrams H, I of FIG. 4. Under such a condition as indicated by diagram K, the diametric pattern 1-4 is fired. At the next crossover point, point "c" which corresponds to IVOLTSEG=2 as indicated by diagram I, a test is made to show that cell 5 is not on, which would have generated peak rectifying volts from the load converter feeding back through the fully inverting source converter. If cell 5 is not on, cell 3 is fired and thereby commutating the diametric fault.

The second course of action is more direct. If a commutation failure is detected in the pulse train limit program, it can call both converters to inversion limit along with issuing a recovery firing pattern to directly recover from the commutation failure without first creating the diametric fault and clearing the recovery flag which may have been set in the "fire" protective program. This is indicated by waveform 212. The latter method provides more volt seconds to commutate the fault but creates a larger recovery current surge because it generates a higher rectifying voltage which feeds into the other fully inverted converter.

Thus what has been shown and described is a load protective system for a load commutated inverter synchronous motor drive system utilizing a line side converter and a load side converter. The protective system is based on a progression of responses in each converter and wherein individual fault detections cause specified corrective action in the faulted converter while also developing a coordinated response in the nonfaulted converter. Furthermore, these actions are implemented in the converter firing controls implemented by computer software independent of command control (motor speed) of the motor drive.

While there has been shown and described what is at present considered to be the preferred embodiment of the present invention, modifications thereto will readily occur to those skilled in the art. It is not desired, therefore, that the invention be limited to the specific implementation shown and described, but it is intended to cover all such modifications, alterations and changes falling within the true spirit and scope of the invention and defined in the appended claims.

We claim:

1. A method of protecting a power conversion system coupled to an AC load and including an AC to DC source side converter coupled from an AC source to a DC to AC load side converter via a DC link circuit and comprising the steps of:

(a) detecting a plurality of system faults by selectively located voltage and current sensor apparatus coupled to said system;
(b) detecting a plurality of system faults by self-contained instructional codes contained in respective first and second computer apparatus coupled to and adapted to control the source side converter and said load side converter;
(c) effecting a direct type of protective action in response to certain ones of said faults detected by said sensor apparatus;
(d) effecting first and second types of computer apparatus assisted protective action in response to certain others of said faults detected by said sensor apparatus; and
(e) effecting said first and second types of computer apparatus assisted protective action in response to said faults detected by said computer apparatus.

2. The method as defined by claim 1 wherein said step of effecting direct type of protective action comprises tripping switchgear for rendering the system inoperative until a reset operation is performed.

3. The method as defined by claim 2 wherein said source side and said load side converters are comprised of thyristor converters and wherein said first type of protective action for faults detected by both said sensor apparatus and faults detected by said computer apparatus comprise the step of (i) calling said converters to their respective inversion limit wherein the thyristor converters are fired substantially at full retard followed by the step of (ii) effecting a predetermined recovery procedure for re-establishing normal operation thereof, and
wherein said second type of protective action comprises the steps of (iii) calling said converters to their respective inversion limit followed by the step of (iv) tripping of switchgear apparatus for shutting the system down.

4. The method as defined by claim 3 and additionally including the steps of:
(f) interconnecting said first and second computer apparatus via a common memory;
(g) communicating a fault to said memory and setting a predetermined bit in a digital storage of said memory to a selected logic state for selected faults detected by either of said computer apparatus;
(h) communicating said setting step to the other computer apparatus; and
(i) said first and second computer apparatus thereafter operating to call their respective converters to inversion limit.

5. The method as defined by claim 4 and wherein said step (a) of detecting a plurality of system faults by sensor apparatus comprises detecting source undervoltage, source overvoltage and source overcurrent.

6. The method as defined by claim 5 wherein the step of detecting source undervoltage and source overvoltage is followed by the step of effecting said second type of computer apparatus assisted protective action of step (d).

7. The method of claim 5 wherein said step of detecting source overcurrent is followed by effecting a direct type of protective action of step (c).

8. The method as defined by claim 4 wherein said step (a) of detecting a plurality of system faults by sensor apparatus comprises detecting load overvoltage and load overcurrent.

9. The method of claim 8 wherein said step of detecting load overvoltage is followed by the step of effecting said second type of computer apparatus assisted protective action of step (c).

10. The method as defined by claim 8 wherein the step of detecting load overcurrent is followed by the step of effecting a direct type of protective action of step (c).

11. The method as defined by claim 3 wherein said step (a) of detecting a plurality of system faults by sensor apparatus comprises sensing thyristor cell overvoltage in said source side converter and said load side converter and thereafter effecting a direct type of protective action, said direct type of directive action comprising the step of directly firing the cell having the overvoltage.

12. The method as defined by claim 3 wherein said step (a) of detecting a plurality of faults by sensor apparatus includes detecting an overspeed condition of an AC motor load which is followed by the step (c) of effecting a direct type of protective action.

13. The method as defined by claim 3 wherein said step (a) of detecting a plurality of system faults by sensor apparatus includes detecting a ground fault which is followed by the step of effecting said second type of computer apparatus assisted protective action.

14. The method as defined by claim 3 wherein said step (a) of detecting a plurality of system faults by sensor apparatus includes the step of sensing a no-start condition of an AC motor load which is thereafter followed by a step of effecting said second type of computer apparatus assisted protective action of step (d).

15. The method as defined by claim 3 wherein said step (b) of detecting a plurality of system faults by self-contained instructional codes contained in said computer apparatus comprises separately detecting source side converter shoot through, source side converter shorted thyristor cell and source side converter commutation failure.

16. The method as defined by claim 15 wherein said step (b) of detecting source side converter shoot through and commutation failure is followed by effecting said first type of computer assisted protective action of step (e).

17. The method as defined by claim 15 wherein said step (b) of detecting source side converter shorted thyristor cell is followed by the step of effecting said first type of computer apparatus assisted protective action of step (e).

18. The method as defined by claim 3 wherein said step (b) of detecting a plurality of system faults by computer apparatus comprises steps of detecting load side converter shoot through, shorted thyristor cell and commutation failure.

19. The method as defined by claim 18 wherein said step (b) of detecting load converter shoot through and commutation failure is followed by the step of effecting said first type of computer apparatus assisted protective action of step (e).

20. The method as defined by claim 18 wherein said step (b) of detecting a load side converter shorted cell is followed by the step of effecting said second type of computer apparatus assisted protective action of step (e).

21. The method as defined by claim 3 wherein said step (b) of detecting a plurality of system faults by computer apparatus includes the step of detecting source side converter overcurrent and load side converter overcurrent and thereafter effecting said second type of computer apparatus assisted protective action of step (e) in the event of either overcurrent condition.

22. The method as defined by claim 3 wherein said step (ii) of effecting a predetermined recovery procedure comprises adaptively selecting a predetermined recovery pattern for firing selected thyristor cells in said source side converter and said load side converter.

23. The method as defined by claim 3 wherein said AC load comprises a synchronous motor.

24. The method as defined by claim 3 wherein said AC load comprises a polyphase synchronous motor and said AC source comprises a polyphase AC source.

25. A protective system for a power conversion system adapted to drive an AC synchronous motor and including an AC to DC source side thyristor converter coupled from an AC source to a DC to AC load side thyristor converter via a DC link circuit, comprising:
(a) voltage and current sensor means for detecting a plurality of system faults;
(b) source side computer means and load side computer means for detecting a plurality of system faults and for respectively controlling the source side converter and the load side converter;
(c) a memory and intercommunication means coupled between said computer means whereby faults detected by either computer means is communicated with the other computer means to effect a coordinated protective action;
(d) means for providing a direct type of protective action in response to at least one of said faults detected by said sensor means;
(e) stored instructional code means in both said computer means for providing first and second types of protective action in response to other faults of said plurality of faults detected by said sensor means; and
(f) stored instructional code means in both said computer means for providing said first and second types of protective action in response to said plurality of faults detected by said computer means.

26. The system as defined by claim 25 wherein said means for providing a direct type of protective action includes switchgear means which is operative in response to a detected fault by said sensor means to shut the system down in an orderly fashion.

27. The system as defined by claim 26 and wherein said first type of protective action by said stored instructional code means operates to call both converters to inversion limit wherein the thyristor converters are fired substantially at full retard and thereafter generating control signals for implementing a predetermined recovery procedure for reinstating normal system operation, and
wherein said second type of protective action operates to call said converters to inversion limit and thereafter generating control signals for operating said switchgear means.

28. The system as defined by claim 25 wherein said stored instructional code means in both said computer means is adapted to generate a predetermined respective bit for a particular fault detected, said bit being set to a predetermined logic state in said memory, said other computer means being adapted to read said predetermined logic state of said bit whereupon both computer means operate to call their respective thyristor converters to inversion limit, following which a recovery procedure is initiated or system shut down is effected.

29. A system for protecting a power conversion system coupled to an AC load and including an AC to DC source side converter coupled from an AC source to a DC to AC load side converter via a DC link circuit and comprising:
(a) means for detecting a plurality of system faults and including selectively located voltage and current sensor means coupled to said system;
(b) means for detecting a plurality of system faults and including a plurality of self-contained instructional codes contained in respective first and second computer means coupled to and adapted to control the source side converter and said load side converter;
(c) means for effecting a direct type of protective action in response to certain ones of said faults detected by said sensor means;
(d) said instructional codes being operable to provide first and second types of computer means assisted protective action in response to certain others of said faults detected by said sensor means; and
(e) said instructional codes being further operable to provide said first and second types of computer means assisted protective action in response to said faults detected by said computer means.

30. The system as defined by claim 29 wherein said means (c) for effecting a direct type of protective action comprises a plurality of switchgear means which are selectively deactivated for shutting down the system.

31. The system as defined by claim 29 wherein said load comprises an AC motor and said source side converter and said load side converter are comprised of thyristor converters, and
wherein said first type of protective action for faults detected by both said sensor means and faults detected by said computer means comprises, (i) calling said converters, respectively, to inversion limit wherein the thyristor converters are fired substantially at full retard followed by, (ii) effecting a predetermined recovery procedure for re-establishing normal operation thereof, and
wherein said second type of protective action comprises, (iii) calling said converters, respectively, to inversion limit followed by, (iv) selective tripping of said switchgear means.

32. The system as defined by claim 31 and additionally including:
(f) a common memory interconnecting said first and second computer means; and
(g) means for communicating a fault signal to said memory and setting a predetermined bit of a digital word therein to a selected logic state for selected faults detected by either of said computer means;
said first and second computer means thereafter operating in response to the bit set to call their respective converters to inversion limit.

33. The system as defined by claim 32 wherein said means for detecting a plurality of system faults by sensor means comprises means for detecting source side and load side overvoltage and overcurrent.

34. The system as defined by claim 32 wherein said means for detecting a plurality of system faults by sensor means includes means for sensing thyristor cell overvoltage in either said source side converter or said load side converter and including means for producing a substantially immediate and direct firing of the cell having the overvoltage.

35. The system as defined by claim 32 wherein said means of detecting a plurality of faults by sensor means includes means for detecting an overspeed condition of an AC motor.

36. The system as defined by claim 32 wherein said means for detecting a plurality of system faults by sensor means includes means for detecting a ground fault.

37. The system as defined by claim 32 wherein said means for detecting a plurality of system faults by sensor means includes means for sensing a no-start condition of an AC motor.

38. The system as defined by claim 32 wherein said means for detecting a plurality of system faults by said self-contained instructional codes contained in said computer means comprises means for detecting source side and load side converter shoot through, source side and load side converter shorted thyristor cell and source side and load side converter commutation failure.

* * * * *